(12) United States Patent
Hayden et al.

(10) Patent No.: US 12,109,651 B2
(45) Date of Patent: Oct. 8, 2024

(54) LASER PROCESSING METHOD FOR THIN FILM STRUCTURES

(71) Applicant: Ilika Technologies Limited, Romsey (GB)

(72) Inventors: Brian Hayden, Lyndhurst (GB); Louise Turner, Salisbury (GB); Thomas Risbridger, Southampton (GB); Thomas Foley, Southampton (GB); Nadeem Rizvi, Denbighshire (GB)

(73) Assignee: Ilika Technologies Limited, Romsey (GB)

( * ) Notice: Subject to any disclaimer, the term of this patent is extended or adjusted under 35 U.S.C. 154(b) by 1042 days.

(21) Appl. No.: 16/971,185

(22) PCT Filed: Apr. 2, 2019

(86) PCT No.: PCT/GB2019/050953
§ 371 (c)(1),
(2) Date: Aug. 19, 2020

(87) PCT Pub. No.: WO2019/193330
PCT Pub. Date: Oct. 10, 2019

(65) Prior Publication Data
US 2021/0101231 A1    Apr. 8, 2021

(30) Foreign Application Priority Data
Apr. 3, 2018 (GB) ..................... 1805624

(51) Int. Cl.
*B23K 26/38* (2014.01)
*B23K 26/0622* (2014.01)
(Continued)

(52) U.S. Cl.
CPC ............ *B23K 26/38* (2013.01); *B23K 26/402* (2013.01); *H01M 10/058* (2013.01);
(Continued)

(58) Field of Classification Search
CPC .. B23K 26/38; B23K 26/402; B23K 26/0624; B23K 26/082; B23K 2101/36;
(Continued)

(56) References Cited

U.S. PATENT DOCUMENTS

| 6,511,627 B1 | 1/2003 | Asahi et al. |
| 2001/0035401 A1 | 11/2001 | Manor |

(Continued)

FOREIGN PATENT DOCUMENTS

| CN | 101490819 | 6/2013 |
| CN | 102939183 | 11/2015 |

(Continued)

OTHER PUBLICATIONS

UK Examination Report mailed Dec. 9, 2022 in corresponding UK Application No. GB1805624.2.
(Continued)

*Primary Examiner* — S. Behrooz Ghorishi
(74) *Attorney, Agent, or Firm* — Renner, Otto, Boisselle & Sklar, LLP

(57) ABSTRACT

A method of processing a thin film structure comprising: providing a thin film structure comprising a stack of two or more thin film layers supported on a surface of a substrate, the stack having a depth orthogonal to the substrate surface; and forming a cut through the depth of the stack by using a direct write laser technique to scan a laser beam along a scan path covering an area of a desired cut line on a surface of the stack to ablate material of the stack along the cut line and through the depth of the stack at least to the surface of the substrate; wherein the direct write laser technique is implemented using an ultrashort pulsed laser outputting pulses with a duration of 1000 femtoseconds or less, at a wavelength in the range of 100 to 1500 nm, and delivering a fluence in the range of 50 to 100,000 mJ/cm2.

18 Claims, 11 Drawing Sheets

(51) Int. Cl.
*B23K 26/082* (2014.01)
*B23K 26/402* (2014.01)
*B23K 101/36* (2006.01)
*B23K 103/16* (2006.01)
*B23K 103/18* (2006.01)
*H01M 10/058* (2010.01)

(52) U.S. Cl.
CPC ........ *B23K 26/0624* (2015.10); *B23K 26/082* (2015.10); *B23K 2101/36* (2018.08); *B23K 2103/172* (2018.08); *B23K 2103/18* (2018.08)

(58) Field of Classification Search
CPC .......... B23K 2103/172; B23K 2103/18; B23K 2103/166; B23K 2103/50; B23K 26/36; B23K 26/40; H01M 10/058; H01M 10/0436; H01M 10/12; H01M 10/28; H01M 10/38; Y02E 60/10; Y02P 70/50
See application file for complete search history.

(56) References Cited

U.S. PATENT DOCUMENTS

| | | | |
|---|---|---|---|
| 2002/0031899 A1 | 3/2002 | Manor | |
| 2002/0088780 A1 | 7/2002 | Boyle et al. | |
| 2004/0259329 A1 | 12/2004 | Boyle et al. | |
| 2005/0155954 A1 | 7/2005 | Oba et al. | |
| 2005/0227455 A1 | 10/2005 | Park et al. | |
| 2007/0272668 A1 | 11/2007 | Albelo et al. | |
| 2010/0038825 A1 | 2/2010 | McDonald et al. | |
| 2011/0071659 A1 | 3/2011 | Farris et al. | |
| 2012/0322241 A1* | 12/2012 | Holden ................ | B23K 26/364 257/E21.599 |
| 2015/0010717 A1 | 1/2015 | Nieh et al. | |
| 2015/0059411 A1 | 3/2015 | Lim et al. | |
| 2016/0086851 A1* | 3/2016 | Park ........................ | H01L 21/78 219/121.68 |
| 2017/0005206 A1 | 1/2017 | Moslehi et al. | |
| 2018/0369964 A1* | 12/2018 | Grapov ............. | B23K 26/1462 |

FOREIGN PATENT DOCUMENTS

| | | | |
|---|---|---|---|
| CN | 105895745 | 8/2016 | |
| GB | 2458986 A | 10/2009 | |
| GB | 2492972 A | 1/2013 | |
| JP | H11147185 A | 6/1999 | |
| JP | 2014/205170 A | 10/2014 | |
| JP | 2017183500 A | 10/2017 | |
| WO | 2007/140149 | 12/2007 | |
| WO | 2008/123053 A1 | 10/2008 | |
| WO | WO-2008134053 A1 * | 11/2008 | ......... B23K 26/0624 |
| WO | 2011/156043 | 12/2011 | |
| WO | 2013/106082 A2 | 7/2013 | |
| WO | 2014/066832 A1 | 5/2014 | |
| WO | 2015/104538 A1 | 7/2015 | |
| WO | 2015/104539 A1 | 7/2015 | |
| WO | 2015/104540 A1 | 7/2015 | |
| WO | 2017/139769 A1 | 8/2017 | |
| WO | 2017/216532 A1 | 12/2017 | |
| WO | 2019/053402 A1 | 3/2019 | |
| WO | 2019/053404 A1 | 3/2019 | |
| WO | 2019/053408 A1 | 3/2019 | |
| WO | 2019/176149 A1 | 9/2019 | |
| WO | 2019/176632 A1 | 9/2019 | |

OTHER PUBLICATIONS

English Translation of Japanese Patent Office Action mailed May 30, 2023 in corresponding JP Application No. 2020-544023.
GB Search Report for corresponding GB Application No. 1805624.2 dated Mar. 6, 2019.
Hamad A.H., 2016, 'Effects of Different Laser Pulse Regimes (Nanosecond, Picosecond and Femtosecond) on the Ablation of Materials for Production of Nanoparticles in Liquid Solution', in Viskup R., High Energy and Short Pulse Lasers, Intech, DOI: 10.5772/63892.
Chichkov B.N., Momma C., Nolte S., von Alvensleben F. and Tunnermann A., "Femtosecond, picosecond and nanosecond laser ablation of solids," Appl. Phys. A, 63, 109-115 (1996).
Patent Office Action mailed Apr. 14, 2023 in corresponding EP Application No. 19717556.5.
International Search Report and Written Opinion for corresponding International Patent Application No. PCT/GB2019/050953 dated Jul. 16, 2019.
Chinese Office Action mailed Dec. 3, 2021 in corresponding Chinese Application No. 201980021879.9.
United Kingdom Examination Report mailed Jul. 25, 2022 in corresponding Untied Kingdom Application No. 1805624.2.

* cited by examiner

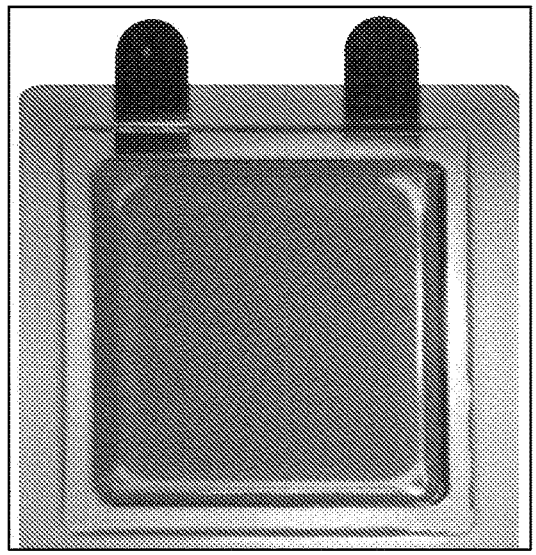 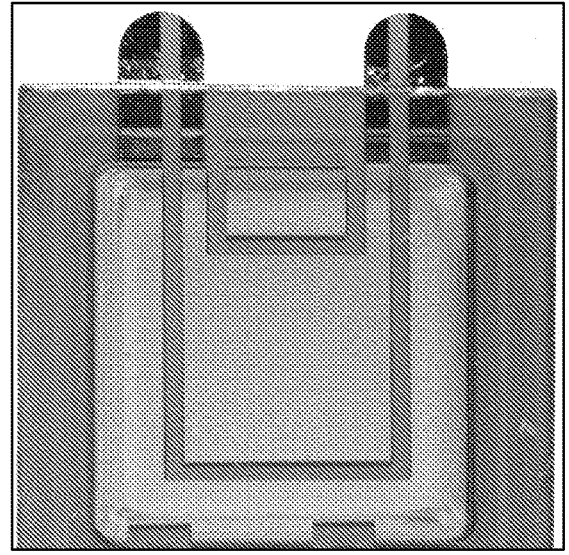
FIG. 9A    FIG. 9B
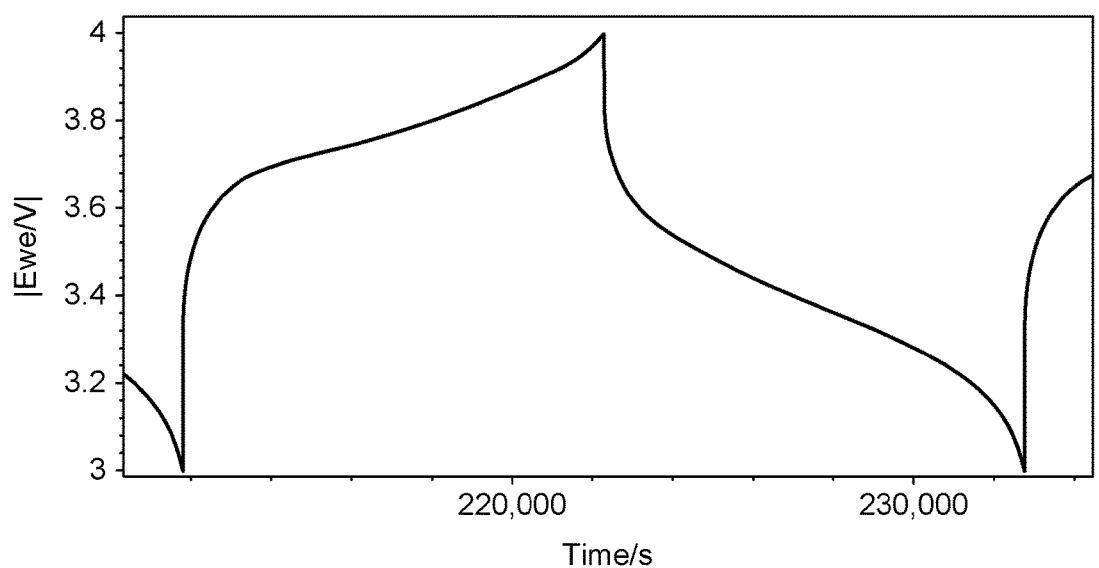
FIG. 10

LASER PROCESSING METHOD FOR THIN FILM STRUCTURES

This application is a national phase of International Patent Application No. PCT/GB2019/050953 filed on Apr. 2, 2019, which claims priority to GB Application No. 1805624.2 filed on Apr. 3, 2018, all of which are hereby incorporated herein by reference.

BACKGROUND OF THE INVENTION

The present invention relates to methods for processing thin film structures using lasers.

Thin film structures comprising a stack of thin film layers of various materials are fabricated in the production of devices such as batteries. A stack is typically formed by depositing multiple layers onto a substrate, also referred to as a wafer. For convenience and ease of handling, a stack on its substrate may have an area very much greater than the required area of the individual devices being produced. Hence, a step in the device production involves the isolation of the stack into smaller parts or elements, each destined to form a separate device. This may be done in more than one stage, such as a first isolation stage through the stack, and a second stage to dice the substrate.

Conventionally, the isolation may be carried out using a shadow masking technique in which light from a laser beam is projected onto the stack surface through a mask patterned to correspond to the required lines. The energy of the laser light removes material not shadowed by the mask, to divide the wafer into the required smaller parts. Excimer lasers are commonly used for this purpose. The technique requires fabrication of the mask. Also, uniform isolation across the stack requires the projection of a uniform intensity field of light across the mask, which can be difficult to achieve.

Accordingly, alternative methods for isolating elements from a fabricated thin film stack are of interest.

SUMMARY OF THE INVENTION

Aspects and embodiments are set out in the appended claims.

According to a first aspect of certain embodiments described herein, there is provided a method of processing a thin film structure comprising: providing a thin film structure comprising a stack of two or more thin film layers supported on a surface of a substrate, the stack having a depth orthogonal to the substrate surface; and forming an ablation through the depth of the stack by using a direct write laser technique to scan a laser beam along a scan path covering an area of a desired ablation line on a surface of the stack to ablate material of the stack along the ablation line and through the depth of the stack at least to the surface of the substrate; wherein the direct write laser technique is implemented using an ultrashort pulsed laser outputting pulses with a duration of 1000 femtoseconds or less, at a wavelength in the range of 100 to 1500 nm, and delivering a fluence in the range of 50 to 100,000 mJ/cm². The average total energy incident upon a unit area, $E_T$, calculated as discussed in the subsequent text (Equation 1), is between $1\times10^{-6}$ mJ/mm² to 1000 mJ/mm².

According to a second aspect of certain embodiments described herein, there is provided a method of fabricating a thin film battery which includes using a method according to the first aspect to form an ablation which isolates an element intended for the battery from a thin film structure comprising a stack of thin film battery layers.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, laser processing methods may be provided in accordance with approaches described herein which includes any one or more of the various features described below as appropriate.

BRIEF DESCRIPTION OF THE DRAWINGS

For a better understanding of the invention and to show how the same may be carried into effect reference is now made by way of example to the accompanying drawings in which:

FIGS. 9A and 9B show photographic images of an encapsulated thin film battery before and after cutting, respectively, using an example method of the present disclosure;

FIG. 10 shows a graph of a charge-discharge cycle measured from a battery such as that in FIG. 9B;

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Embodiments of the present disclosure relate to methods of processing a thin film structure comprising thin film layers stacked on a substrate. The thin film layers can be sequentially deposited on the substrate using any deposition technique or otherwise fabricated, to form a stack of layers supported on the substrate surface. The processing of the structure comprises using a direct write laser technique (or laser direct write technique) to divide the stack into smaller elements, suitable for individual devices such as batteries or other electronic components. The parameters used for the direct write laser technique are described in more detail below. A direct write laser technique refers to a method in which a laser beam shaped and/or focused to a spot is incident directly onto the surface of an item to be processed, in this case the thin film stack. Relative movement between the laser beam and the item is carried out so that the incident spot is scanned, or written, across the surface of the item along a line or over an area where an effect enabled by the delivery of energy from the laser beam is required. In the present disclosure, the effect is the removal of material from the stack along desired cut lines which divide the stack into the required smaller elements. Ablation of the material is the main mechanism by which the material is removed along the cut lines. Direct laser writing should be contrasted with laser processing techniques in which the area of laser beam exposure is stationary, such as over a large area field, and/or the beam reaches the surface only indirectly, by passing through a mask, for example.

Laser processing techniques according to the present disclosure are of particular interest for dividing a thin film structure into smaller elements intended for use as batteries. Examples presented herein may relate to batteries. However, the disclosure is in no way limited in this regard, and is applicable to any structures comprising thin film stacks intended for other elements or components. Any reference to batteries should be understood as applicable to other components unless the particular context indicates otherwise.

Figure 1:
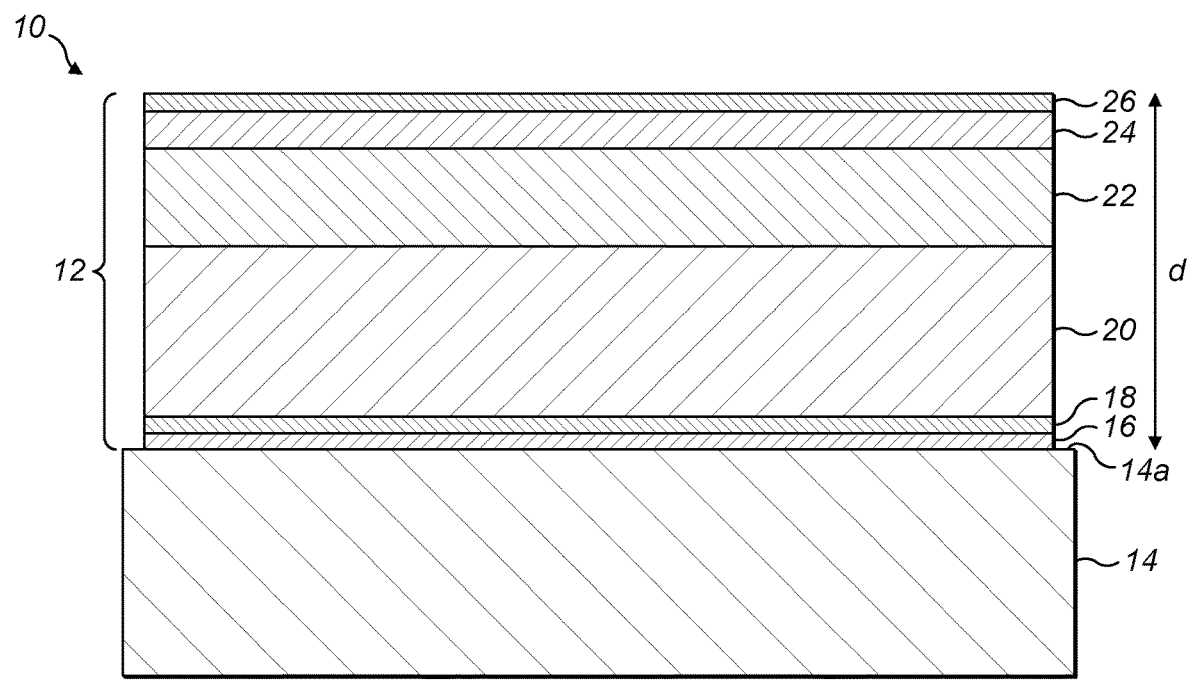
FIG. 1 shows a schematic cross-sectional view of an example thin film stack to which methods of the present disclosure may be applied.

FIG. 1 shows a schematic cross-sectional view (not to scale) of a thin film structure 10, through the depth d of a multi-layer thin film stack 12 supported on the surface 14a of a substrate 14. The various thin film layers of the stack 12 may be deposited using a vapour deposition process, such as the physical vapour deposition processes described in WO 2015/104538, WO 2015/104539 and WO2015/104540 [1, 2, 3], or by sputtering such as RF magnetron sputtering and DC sputtering, for example. In this example, the stack is designed for the fabrication of batteries, so the layers of the stack 12 comprise layers suitable for implementing the various components of a battery. The substrate 14 is a wafer of non-conductive, semi-conductive, conductive material (such as p-type boron-doped silicon grown by the Czochralski method (CZ silicon)). Other materials, such as silicon, aluminium oxide (sapphire), silicon carbide or gallium arsenide, may also be used. A first layer on the surface 14a is an adhesion layer 16, comprising a layer of titanium. Overlaying this is a layer providing a cathode current collector 18, formed from platinum. A layer of lithium cobalt oxide forms a cathode 20 covering the platinum layer 18. An electrolyte separator layer 22 comprising lithium phosphorous oxynitride (LiPON) is deposited on top of the cathode 20. An amorphous silicon ($\alpha$-Si) layer overlies the electrolyte layer 22 to provide an anode 24. Finally, a platinum layer forms an anode current collector 26 over the anode 24. This structure is purely exemplary, however, and the structure may comprise more, fewer or other layers formed from other materials. Once fabricated or otherwise obtained, the structure 10 can be cut to isolate individual battery elements or cells one from another, using an embodiment of a laser direct write technique according to the present disclosure.

Figure 2:
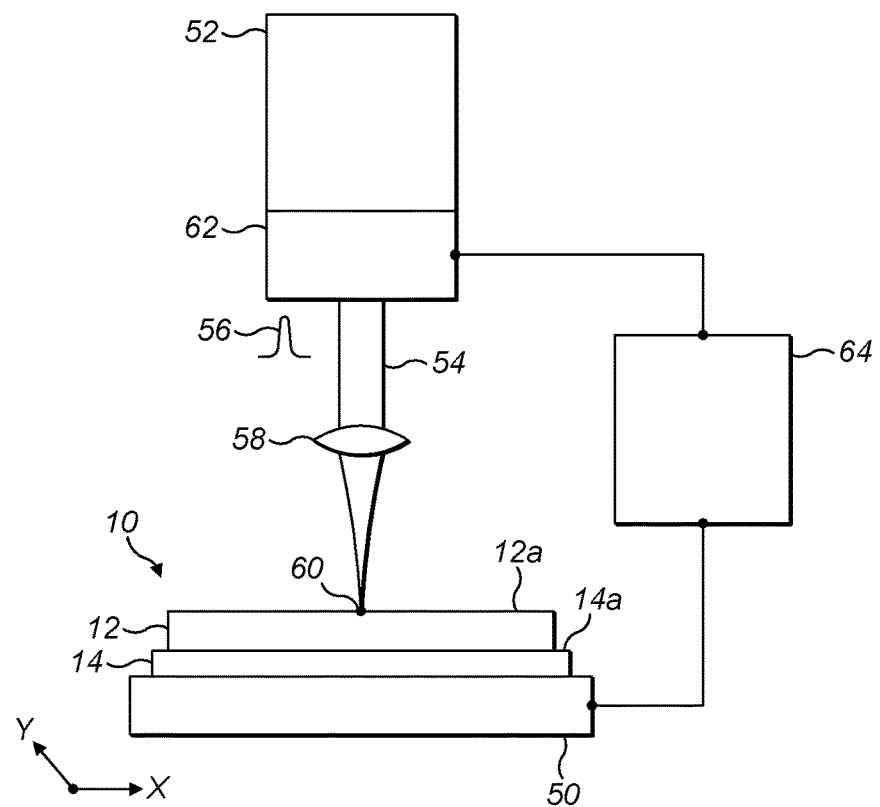
FIG. 2 shows a schematic representation of an example apparatus by which methods of the present disclosure may be implemented.

FIG. 2 shows a schematic view (not to scale) of an example apparatus which may be used to carry out the laser direct write technique. The structure 10 comprising the stack 12 on the substrate 14 is mounted on a translation stage 50 or similar device configured to provide movement of the structure in an XY plane parallel to the surface 14a of the substrate 14. The movement is orthogonal to the depth (thickness) of the stack 12. A laser 52 is provided to generate a beam 54 of laser light, output as a sequence of ultrashort (ultrafast) pulses 56, by which is meant pulses with a duration in the femtosecond or picosecond regime. The beam 54 is focused by a focusing arrangement comprising one or more lens, mirrors or the like to a spot 60 which is directed onto the surface 12a of the stack 12. The focal point may be above, at or below the surface 12a of the stack, so the spot 60 on the surface 12a may or may not coincide with the focus. As depicted, the beam 54 is aimed straight at the structure 10, but beam directing optics such as mirrors and prisms may be included to produce a more complex beam path if this is more convenient. In general, though, the beam direction will be substantially orthogonal to the stack surface 12a at the point of incidence (location of the spot 60).

The output of the laser 52 is characterised by a number of parameters. These include wavelength, pulse duration, pulse repetition rate, pulse power or energy, and/or average power or energy. One or more of these parameters may be adjustable or tunable, so the apparatus can include a laser adjustment unit 62 comprising one or more controls or components by which the value of one or more parameters can be altered. The unit 62 may be an integral part of the laser 52 as shown and additionally or alternatively may comprise one or more optical elements separate from the laser 52 and placed in the beam path (not shown). The control may include turning the beam on and off, which may be by turning the laser itself on and off, or by interrupting the beam with an opaque barrier.

According to the direct write laser technique, the laser beam spot 60 is scanned over the stack surface 12a according to a desired scan path for cutting the stack (described further below). To effect this scanning, or writing, in this example, the structure 10 is moved in the XY plane using the translation stage 50 so that the spot 60 traces the required path via the relative movement between the structure 10 and the laser beam 54. In alternative arrangements, the scanning is achieved by the structure 10 remaining stationary while the laser 52 is moved, or the beam 54 is moved using beam directing elements. Furthermore, both the structure and the laser 52/beam 54 may be moved. In any arrangement, a relative movement between the location of the spot 60 and the stack surface 12a is effected in order for the spot 60 to write the intended path over the stack surface 12a.

The writing path is required to be accurately positioned and the scanning speed (the speed of the relative movement) may be very fast. In order to implement the scanning with the appropriate precision, the apparatus may include a controller 64 (such as a suitably programmed or programmable computer (microprocessor) for example) that automatically controls the movement of the translation stage 50.

Conveniently, the controller may also control the laser adjustment unit 62 so that the laser output parameters can be adjusted in conjunction with (such as synchronously with) the control of the scan movement. If the movement is performed through the laser or the beam, the controller 64 can control this movement instead of, or together, with the movement of the translation stage 50.

Figure 3:
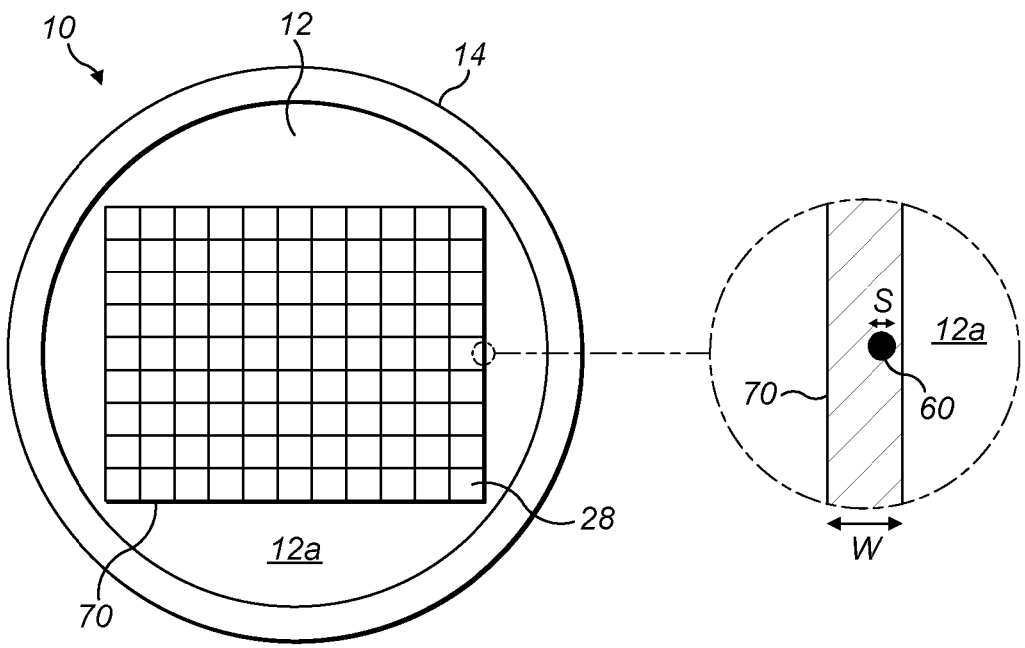
FIG. 3 shows a schematic plan view of an example thin film stack to which methods of the present disclosure may be applied.

FIG. 3 shows a schematic plan view (not to scale) of a thin film structure 10 comprising a thin film stack 12 on the surface of a substrate or wafer 14. The stack and the substrate are depicted as circular, but this an example only and other shapes may be used, and the stack and substrate need not be the same shape. Superimposed on the surface 12a of the stack 12 is a grid formed from a plurality of adjacent squares, each of a smaller area than the total area of the stack surface 12a. Each square corresponds to a cell 28 or other element which is to be cut from the structure 10. The grid therefore represents a required cut line 70 along which the structure 10 is intended to be cut through the depth of the stack 12 to isolate the cells 28 from their neighbours and from other parts of the structure 10. Note that the shape of the grid and the square shape of the individual cells 28 is an example only. The cut line or lines 70 can be arranged in any shape, and the cells 28 or other elements can be any desired size or shape, and need not all be the same size or shape. Note that the grid shown in FIG. 3 is for illustrative purposes only to present an example of a possible cut line. In reality, the cut line 70 is not marked on the stack surface.

FIG. 3 includes a magnified view of a portion of the cut line 70. The cut line has a width W, being the width of material which is required to be removed from the stack between each adjacent cell by the direct write laser processing. Also shown is the spot 60 from the laser beam as it is incident on the stack surface 12a for performing the cutting. The spot 60 has a width or diameter S (the spot is depicted as circular, but need not be). Note that the spot width S is smaller than the cut line width W. As shown, S is about one-third of W, but for practical purposes S will often be many times smaller than W (by one or more orders or magnitude, for example). S may be at least 50-100 times smaller than W for example, such as S being 0.015 mm and W being 1 mm. The spot width may be defined as the full width half maximum of the beam intensity profile. Therefore, in order to remove the required material of the stack which is under or behind the cut line 70, the spot 60 needs to be scanned relative to the width of the cut line as well as along its length. The scanning movement moves the spot 60 so as to cover the area of the cut line. The spot 60 should pass over the whole area of the surface 12a occupied by the cut line 70. Hence, in most cases, the laser writing will not be a simple linear pass of the spot 60 along the desired cut line 70. To achieve the required amount of material removal, a more complex motion of the spot in the XY-plane can be used. The motion should cause the spot to pass over every part of the cut line area at least once so that every part of the stack material under the cut line receives energy from the laser beam. The movement of the spot is a scan path which is designed to uniformly cover the cut line area. Various motions can be implemented to achieve the required coverage. The scan path may be continuous or discontinuous. For example, a series of hatched scanning lines can be used to achieve a uniform depth of ablation. The beam is scanned over a part of the cut line width in a first direction, and also in a second direction roughly orthogonal to the first direction. Then two more orthogonal directions are followed, oriented at an angle to the first pair of directions. This may be repeated with a third, fourth or more pairs of orthogonal directions as necessary to deliver the required energy to the stack material (discussed further below). The directions may be followed in any order, and all or a group of the first direction lines may be scanned before all or a group of the second direction lines, and so on, with the multiple lines along a particular direction being parallel to each other and spaced by hatch pitch, which may be less than the spot width S, for example about half the spot width.

Other scan paths to cover the cut line area may used, such as a raster scan of multiple parallel lines of the same direction across the cut line width W (interrupted scan path), or a square wave serpentine scan of multiple parallel lines in successive opposite directions across the cut line width W (continuous scan path). Furthermore, an alternative approach may be to scan the laser in a sinusoidal pattern such that the propagation of the wave is perpendicular to the cut line width W, with peak-to-peak amplitude equal or less than the cut line width W and frequency and line speed sufficient to achieve uniform ablation across the area. This approach may be overlaid with further repeat scans of identical or varied position, amplitude and frequency. These are examples only, and other paths or patterns may be used.

An advantage of the use of direct write methods that create the desired ablation pattern by either changing direction or starting and stopping at the pattern boundaries is that the ablation depth tends to be deeper at these boundaries. This is due to the non-linearity of the speed of the motor that controls the mirror that reflects the laser light, which results in the mirror target persisting for longer at the boundaries of the desired pattern, producing the advantageously deeper ablation which ensures isolation of the materials.

In some cases, it may be that the required width W of the cut line can be matched by the spot width S so that movement along the length of the cut line (orthogonal to the width W) covers the whole cut line area. Sometimes, however, the laser beam will require focusing down to a small spot size to deliver enough fluence (energy per area) to remove the stack material, where the small spot size will be less than a suitable width for the cut line, such as to provide effective isolation of the cells from their neighbours. Focussing may be omitted, however.

For any pattern of scan path, it may be necessary to employ multiple passes, that is, to repeat the whole exposure path one or more times to deliver sufficient laser energy to the stack material to remove the full width of the cut line through the full depth of the stack. The path may be exposed twice, or three, four, five, six, seven, eight or more times, as necessary. Overall, the aim is to deliver a particular number of pulses to the area of the cut line area to deliver enough laser energy for the cut, so that, if using the hatched approach and the number of hatch angles is reduced, for example, a larger number of path exposures or passes will be needed. Conversely, a larger number of hatch angles can enable a decrease in the number of passes.

The combined effect of variables pulse width, rep rate, laser spot area, scan speed, laser path, number of passes and laser energy (fluence or energy per pulse) for a given wavelength can be estimated by calculating the single parameter total energy per unit area of ablation, $E_T$ which has units of mJ mm$^{-2}$. $E_T$ can be calculated according to equation 1, where $t_T$ is total ablation time in seconds, $t_p$ is pulse width in seconds, $f_{rep}$ is repetition rate in reciprocal seconds, $A_L$ is area of laser spot in millimetres squared (measured at full width half maximum of the beam intensity profile), $A_T$ is total area of ablation in millimetres squared, and $\varepsilon_S$ is the energy of a single laser pulse in mJ. The equation can be broken down into four parts, as shown by bracketed sections in Equation 1. Part one calculates the average total time to ablate a unit area, part two corrects for the fact that the laser is not on all the time but fires in pulses, part three determines the fraction of the total area ablated which is equivalent to one laser spot of area $A_L$. Together, these first three parts calculate the total ablation time per single laser spot of area $A_L$. Part four calculates the energy delivered per unit time in one spot of area $A_L$. It should be noted that $E_T$ is distinct from fluence, even though it has the same units. $E_T$ is more appropriate for describing the laser ablation than assessing the variable individually.

$$E_T = \left(\frac{t_T}{A_T}\right) \times (t_P \times f_{rep}) \times \left(\frac{A_L}{A_T}\right) \times \left(\frac{\varepsilon_S}{t_P}\right) \qquad \text{Equation 1}$$

The type of scan pattern and the hatching method employed can have a significant contribution to the quality of the ablation. For example, it was found that by employing a continuous sinusoidal scan pattern, surprisingly less debris was generated compared to a non-continuous parallel line hatched pattern. This is advantageous as an excess of debris can be detrimental for neighbouring ablations. Furthermore, it was also found that amount of re-deposition of the ablated material varied such that the sinusoidal scan pattern produced surprisingly less re-deposition of the substrate material onto the newly ablated sidewall. Minimising the amount of re-deposition is crucial to the functioning of the structure as a battery. These effects may depend on the application and materials, the parameters chosen and on the dimensions of the cut. This effect is greatly accentuated with the use of the sinusoidal laser ablation method, which creates even deeper ablations at the edges of the ablation channel. This provides an ideal method for achieving isolation with a minimal amount of ablation.

The direct write laser technique is performed to deliver laser energy to the material of the stack behind (under or below) the area of the desired cut line which is sufficient to ablate the material, thereby removing a volume of material under the cut line to isolate the cells from one another. Herein, the term "cut" (alternatively, "slice" or "dice") is used to refer to this process and the incision or channel which is made by it, since it is intended to separate the individual elements of the stack from their neighbours analogous to cutting a large item into smaller parts, even though some conventional uses of "cut" indicate a mere separating shear between two parts without any removal of intermediate material to effect the separation. In the present disclosure, an ablation is performed to remove material through the full depth of the stack, at least as far as the surface of the substrate, so that the cut extends through the entirety of the stack. Accordingly, it is necessary to ensure that a sufficient amount of energy is delivered to exceed the ablation threshold for the stack material, that is, the amount of energy to cause ablation by creating a plasma from the material, rather than the heating and evaporation that can occur at lower energies. In the present disclosure, the energy is considered in terms of the laser fluence, which is the amount of energy delivered to the material per unit area. The fluence can therefore be controlled by adjusting the output power or energy of the laser, and by adjusting the size of the focused spot. Increasing the power or energy and decreasing the spot size both increase the fluence by increasing the energy density in the spot. Also, recalling that the direct write scan is designed to deliver energy over the whole area of the cut line, the amount of energy delivered per unit area is also dependent on the pulse repetition rate and the scan speed (speed of the relative movement between the spot and the stack surface). A higher repetition rate for the same scan speed, or a slower scan speed for the same repetition rate, will increase the fluence by increasing the number of pulses delivered per unit length of the scan path.

An increased fluence will typically increase the amount of material ablated by a single exposure of the scan path, so the total number of exposures needed to cut through to the substrate may be reduced. Processing time per thin film structure can thereby be minimised. However, it has been found that further increases in the fluence may reduce the quality of the edge of the cut through the stack. The side walls of the cut become rougher and more likely to improperly isolate a cell from its neighbour. Furthermore, the fluence an has been shown to affect the amount of debris generated during the ablation, which can have significant detrimental effects for neighbouring ablations. These effects may depend on the application and materials, and also on the width of the cut, so will vary between processes and should be chosen for a particular process, perhaps by reference to preliminary tests to determine a maximum fluence for a suitably smooth and debris-free cut. Example values for the fluence are discussed in more detail later.

Figure 4:
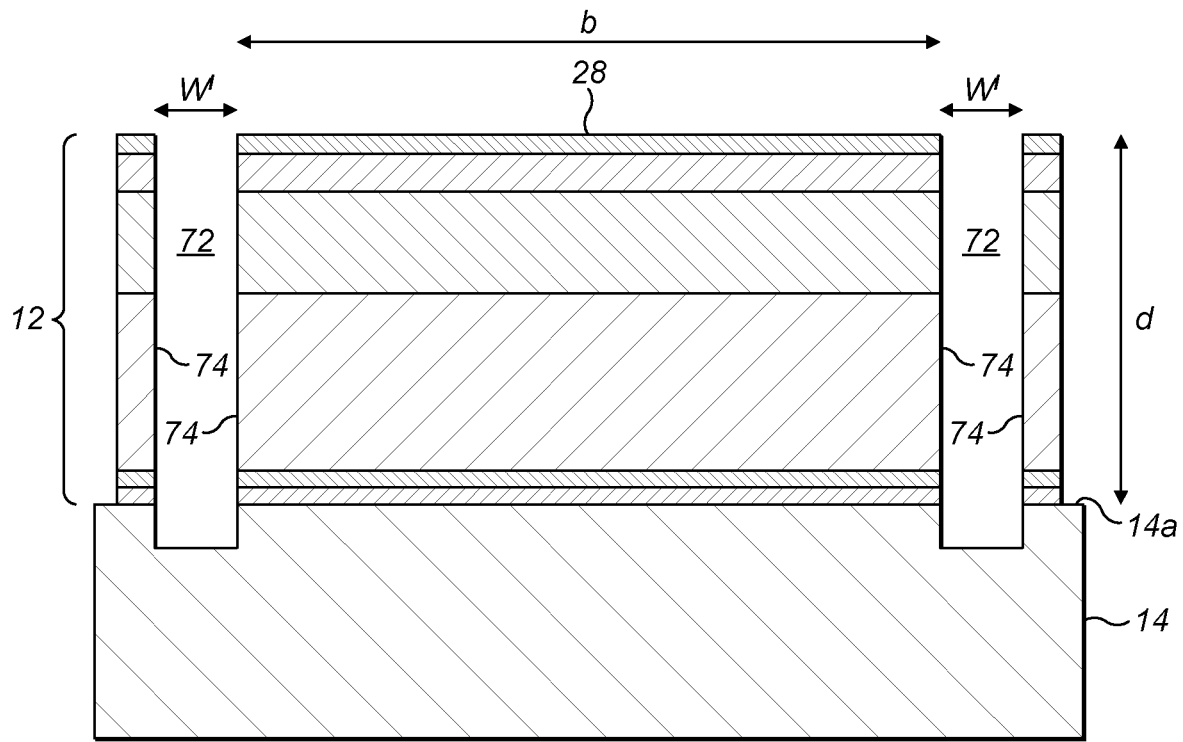
FIG. 4 shows a schematic cross-sectional view of the stack of FIG. 1 after application of a laser direct writing process according to the present disclosure.

FIG. 4 shows a cross-sectional view of the thin film structure of FIG. 1 after cutting by a direct write laser process as described above. Two cuts 72 have been made through the full depth d of the thin film stack 12, so that all layers in the stack 12 are separated. The cuts 72 are spaced apart by a distance b, being the required size of an individual cell 28 into which the structure is to be diced. The cuts 72 have a width W' which is related to and similar to the width W of the cut line 70 in FIG. 3, but may not be precisely equal to it owing to the nature of the ablation process which may remove some material beyond the exposed area, for example, and may cause some surface roughness of the side walls 74 of the cuts 72. Also, the cuts 72 may not have a constant width W' throughout the full depth of the cut. A varying width may arise depending on the intensity profile of the focused spot, for example.

It has been found that a Gaussian beam profile tends to produce an ablation with slightly sloped or stepped walls, in that the cut width decreases with depth (the cut is wider at the stack surface than at the substrate surface) by approximately the radius of the laser spot size. Typically, steps are seen between different material layers, while slopes are seen within a single material layer. This is considered to be a benefit in some circumstances, in that it can produce a more effective isolation of the cells from each other after cutting. Other beam profiles that have a greater intensity in the beam centre compared to the edges, such as a Bessel profile, can be expected to provide a similar effect.

Note that in FIG. 4, the cuts 72 extend through the full depth (or thickness, the direction orthogonal to the substrate surface 14a) of the stack 12 plus a small distance into the substrate. The aim of the laser processing is to cut completely through the stack, and it is generally unimportant whether some of the substrate material is also removed. It can be difficult to control the cutting processing so that cessation of material removal coincides precisely with the depth at which the substrate surface is located. Hence it may be simpler to aim to cut beyond the stack depth and accept at least some cutting into the substrate material. This ensures at least that the stack is fully cut through even the lowest layer. However, to minimise time and energy consumption, the process can be controlled to stop the cutting process at some distance into the substrate material, in other words, past or beyond the substrate surface.

Figure 5:
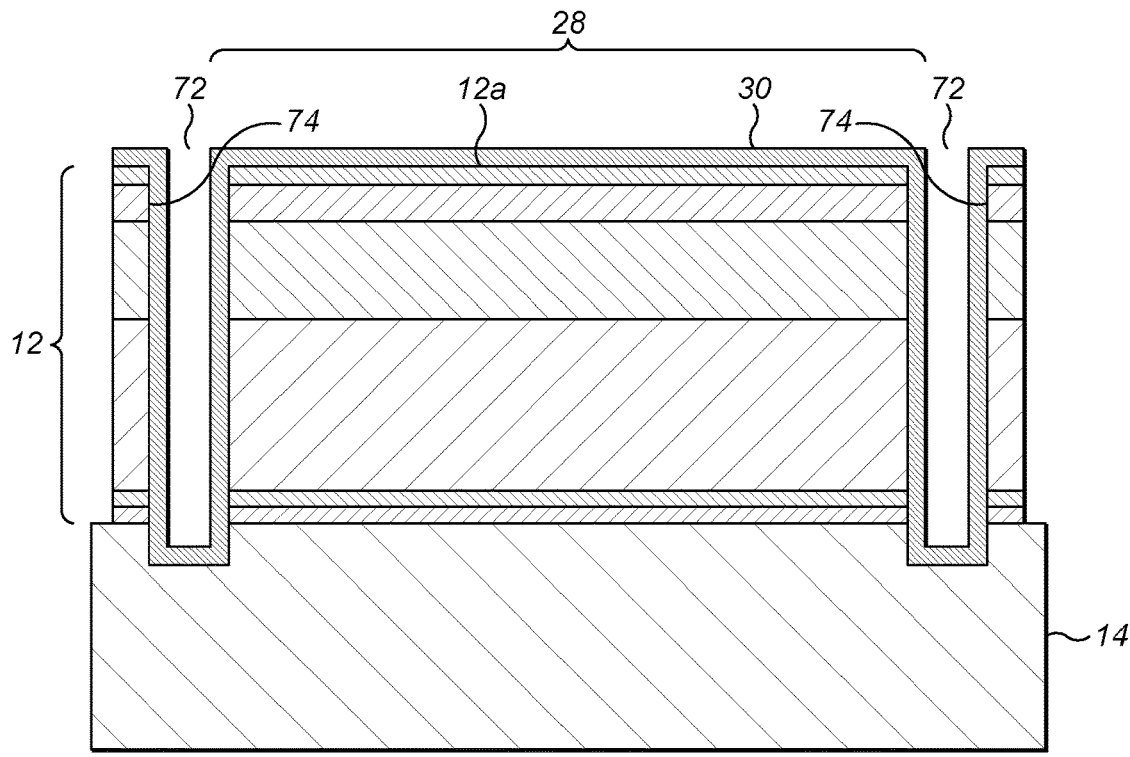
FIG. 5 shows a schematic cross-sectional view of the stack of FIG. 4 after an encapsulation step.

FIG. 5 shows a cross-sectional view of the structure of FIG. 4 after a next stage in an example of fabrication of a battery, in which the entire external surface of the stack 12 is encapsulated in a layer of dielectric material 30. The external stack surface comprises, following the laser cutting, the original top surface 12a of the stack 12 (being the upper surface of the anode current collector 26) plus the side walls 74 of the cuts 72. The base of the cuts, formed by the material of the substrate 14, is also covered. The encapsulation may be carried out, for example, by sputtering of aluminium oxide and aluminium nitride diads.

Figure 6:
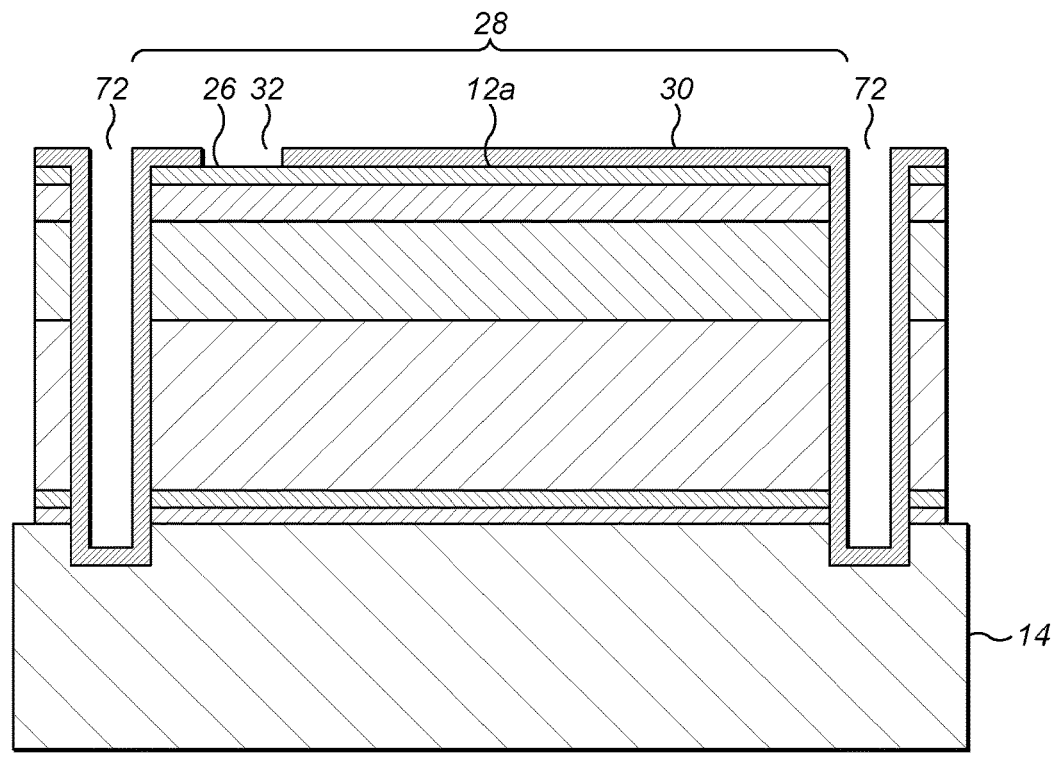
FIG. 6 shows a schematic cross-sectional view of the stack of FIG. 5 after a further processing step to enable electrical connection.

FIG. 6 shows a cross-sectional view of the structure of FIG. 5 following a further processing stage in the battery fabrication example. An opening 32 is etched through the encapsulating layer 30 to expose a small area of the anode current collector 26 on the top surface 12a of the isolated cell 28. This is to provide a route for an electric connection to be made to the anode current collector. This etching can be achieved by a range of photolithographic and non-photolithographic processes incorporating dry etching techniques including, but not limited to, inductively coupled plasma-reactive ion etching (ICP-RIE), reactive ion etching (RIE) and ion beam milling using suitable process gas chemistries. Etching could also be achieved by other methods such as photolithographic and non-photolithographic processes incorporating wet etching techniques.

Note that at this point, the isolated cells 28 are still all supported on the substrate 14, since the cuts 72 extend only partly into the substrate, or not at all, if the cutting process has stopped at the substrate surface. This is for convenience in the processing steps following the laser cutting, since it is easier to handle a mass of cells held in position by a single substrate than to handle the individual cells. However, in the present example, the cells are now physically separated from one another by dicing the substrate (wafer). Note also that, in alternative fabrication procedures, the initial direct laser write cutting can extend through the whole substrate to achieve isolation of the elements and dicing of the wafer in one stage.

Figure 7:
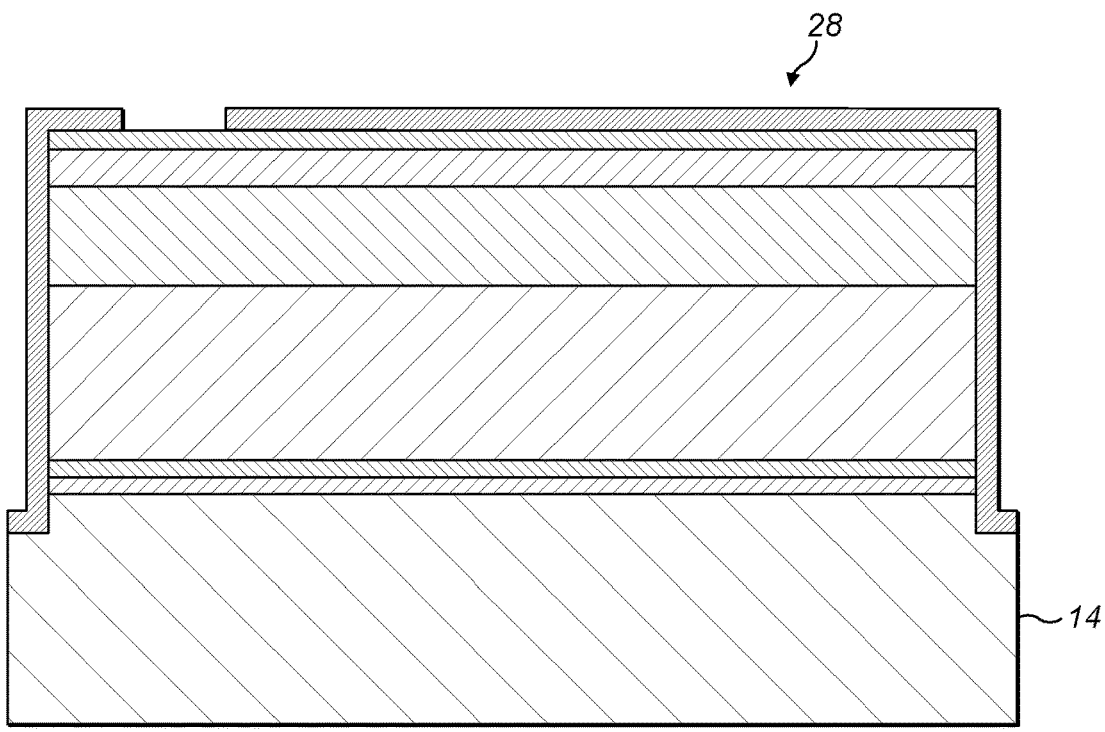
FIG. 7 shows a schematic cross-sectional view of a cell diced from the stack of FIG. 6.

FIG. 7 shows a cross-sectional view of the cell 28 of FIG. 6 after dicing of the substrate 14. The dicing comprises cutting or slicing through the remaining thickness of the substrate at the base of the existing cuts 72 from the direct write laser cutting. The dicing may be performed using another direct write laser cut similar to that already described, or by other methods such as laser exposure using shadow masking. The result is an individual cell 28 (die or element) entirely separated from the rest of the cells from the same substrate.

Figure 8:
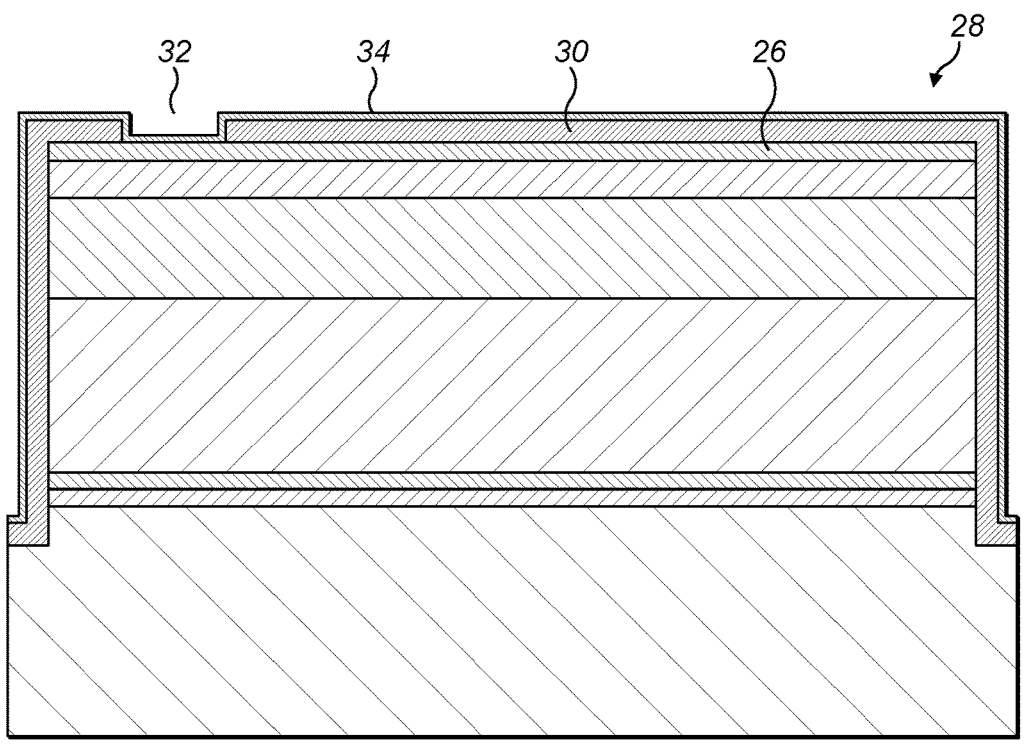
FIG. 8 shows a schematic cross-sectional view of the cell of FIG. 7 after application of a conductive track layer.

FIG. 8 shows a cross-sectional view of the cell 28 of FIG. 7 after an additional processing step, in which a metal (conductive) track layer 34 is deposited over the outer surface of the cell 28. Other techniques for making the required electric connections can be used instead, such as wire bonding to the anode collector 26 through the opening 32 in the encapsulation layer 30.

As a demonstration of an example direct write laser cutting technique as disclosed herein, a battery was fabricated with a structure similar to that described above with reference to FIGS. 1 and 4-8, but which was isolated from neighbouring cells on the substrate by a conventional aperture shadow masking technique. This provided a battery structure with an architecture known to be operational. An example of a direct write laser technique was then employed to divide out a portion from the battery, including parts of the electrical contacts. This approach allowed operational performance to be tested after the laser cutting in the knowledge that any changes were attributable to the laser cutting alone, and not to some other fabrication defect that could arise elsewhere in the overall fabrication.

FIG. 9A shows a photograph of the initial battery fabricated using conventional shadow masking. The stack of layers including the cathode, electrolyte, anode, current collector and dielectric encapsulation have square shapes, all with widths of 12 mm except the electrolyte and dielectric encapsulation, which are 14 and 15 mm wide respectively. Note the current collector layers also have tabs for connection access. The substrate was a sapphire wafer of thickness 675 μm+/−25 μm. An adhesion layer of titanium oxide was sputtered from a titanium target with oxygen process gas at 400° C. A platinum cathode collector layer was sputtered from a platinum target at 400° C. To form the cathode, lithium cobalt oxide was co-deposited via physical vapour deposition at 400° C. from a lithium Knudsen cell and a cobalt electron gun in oxygen plasma. For the electrolyte layer, LiPON was deposited by RF magnetron sputtering at 150° C. from a $Li_3PO_4$ target in nitrogen gas. An amorphous silicon anode was deposited by physical vapour deposition at 25° C. from a silicon electron gun. A platinum anode collector layer was deposited by DC sputtering at 25° C. from a platinum target. The battery has an outer dielectric encapsulation layer with a width of 15 mm, comprising sputtered aluminium oxide and aluminium nitride diads deposited at 150° C. from an aluminium target in oxygen and nitrogen process gases. The two current collector tabs that enable connection of the battery can be seen at the top of the image.

FIG. 9B shows a photograph of the battery of FIG. 9A after additional cutting using the direct write laser approach to ablate through every battery layer and partially into the substrate. The cut line was chosen to isolate a central square area of the battery with a width of 6 mm, plus maintaining connected sections of the current collector tabs to allow electrical connection of the cut-out portion for testing. The precise and accurate nature of the cutting is apparent.

The laser ablation was carried out using a femtosecond solid-state laser operating at a wavelength of 343 nm. The fluence was 856 mJ/cm, delivered at a pulse repetition rate of 185 Hz and a pulse duration of 130 fs with a scan speed of 500 mm/s. The beam had a width (spot size) of 0.015 mm, and was scanned to cover a cut line of 500 μm width by following a scan path with a hatching pattern. The lines of the hatching pattern were arranged in four sets of two overlaid angles, with a hatch pitch of 7 μm. Six passes of the scan path were performed.

The ablated cut lines were studied using scanning electron microscopy and energy dispersive X-ray spectroscopy. This confirmed that the ablation had been performed through the complete depth of the stacked layers, down to the level of the substrate.

After the laser direct write cutting, the cut-out battery was dried and encapsulated with ossilla epoxy and a multilayer sheet of muscovite mica to provide a protective barrier against air and moisture. Performance of the battery was then tested. The battery was cycled (subjected to multiple charges and discharges) using a potentiostat at a constant current of 50 μA between 3 and 4 V.

FIG. 10 shows a graph of a single example charge and discharge cycle measured from the battery, as a plot of voltage against time. This confirms good performance of the battery, indicating that the direct write laser cutting did not impede or impair its operation.

Figure 11A:
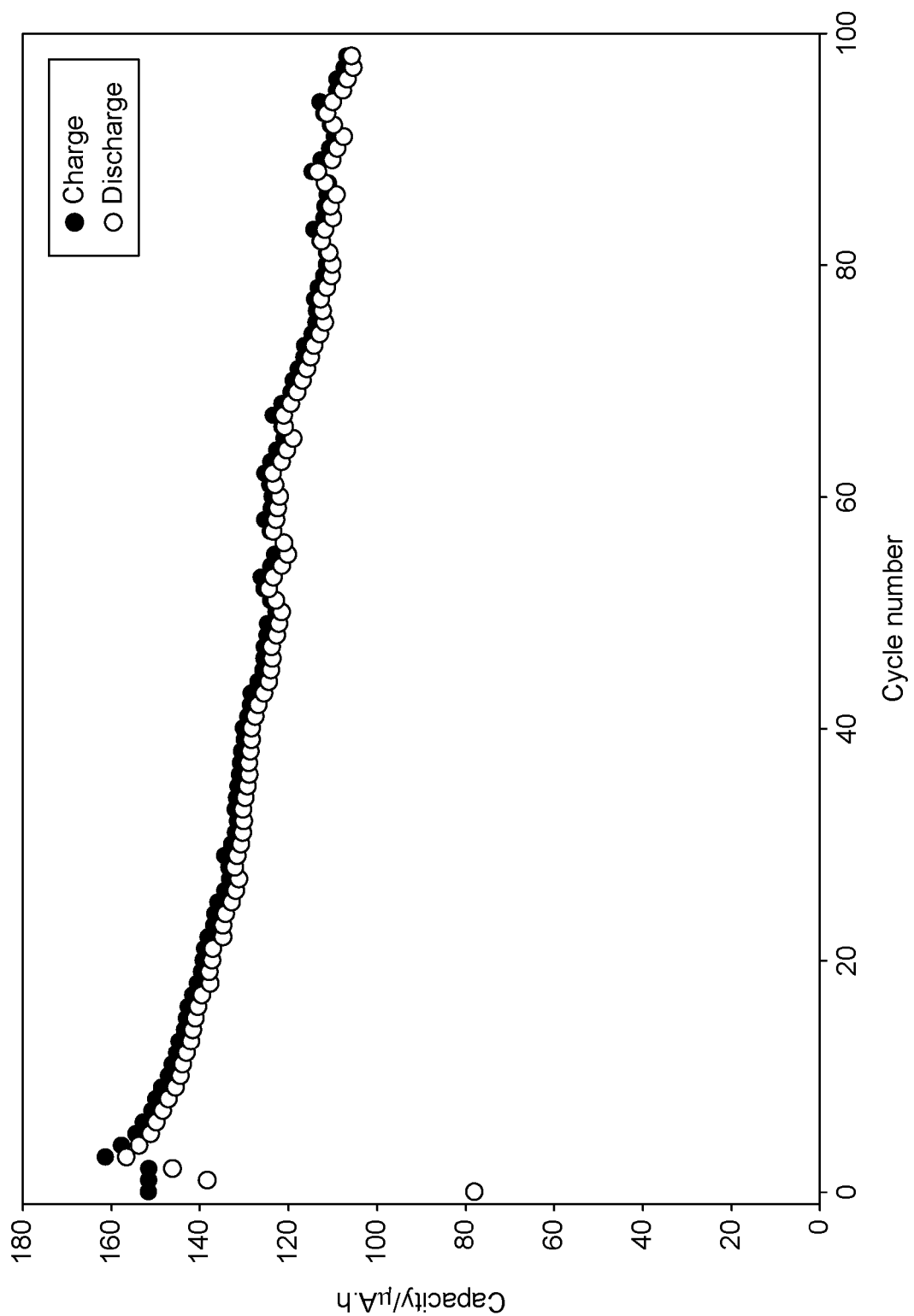
FIG. 11A shows a graph of battery capacity over multiple charge-discharge cycles measured from a battery such as that in FIG. 9B.

FIG. 11A shows a graph of data from multiple cycles, as a plot of charge and discharge capacities measured for 100 consecutive cycles. The capacity is maintained at a reasonable level over this lifetime, with only a small decline which is comparable with expected values for a similar conventionally-fabricated thin-film battery. This indicates that the direct write laser cutting does not impact the operation of the battery.

Figure 11B:
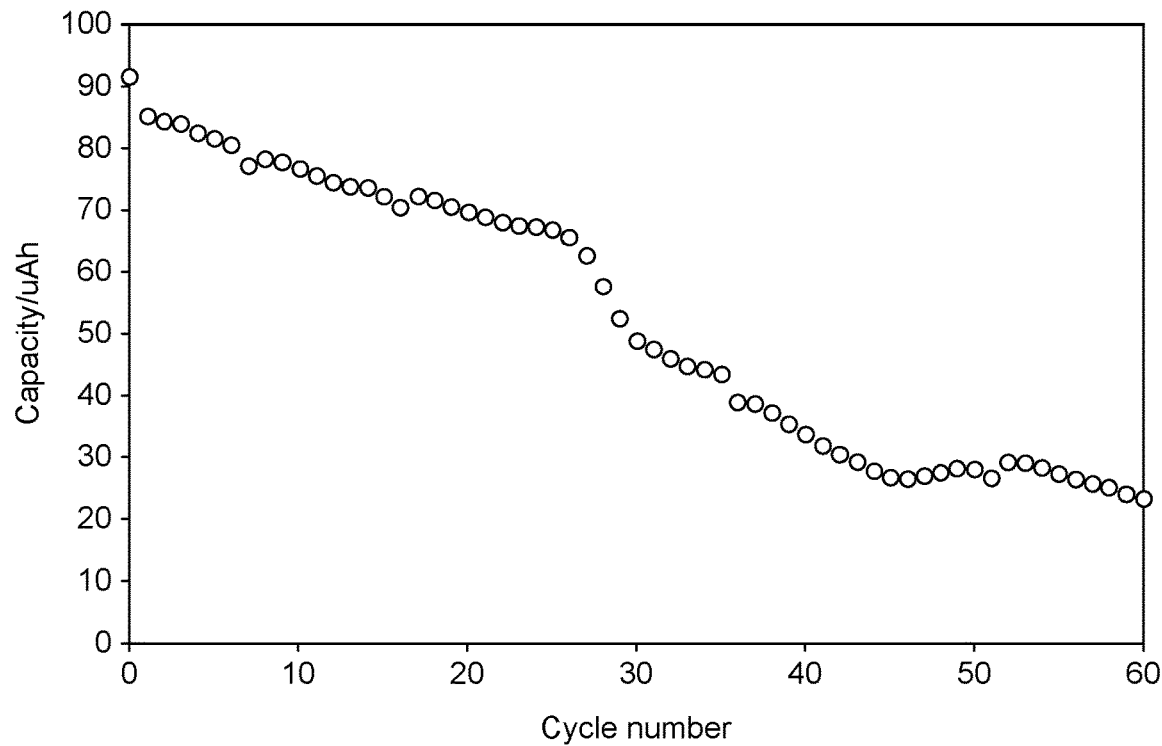
FIGS. 11B and 11C show graphs of battery discharge capacity over multiple charge-discharge cycles measured from another example of a thin film battery.
Figure 11C:
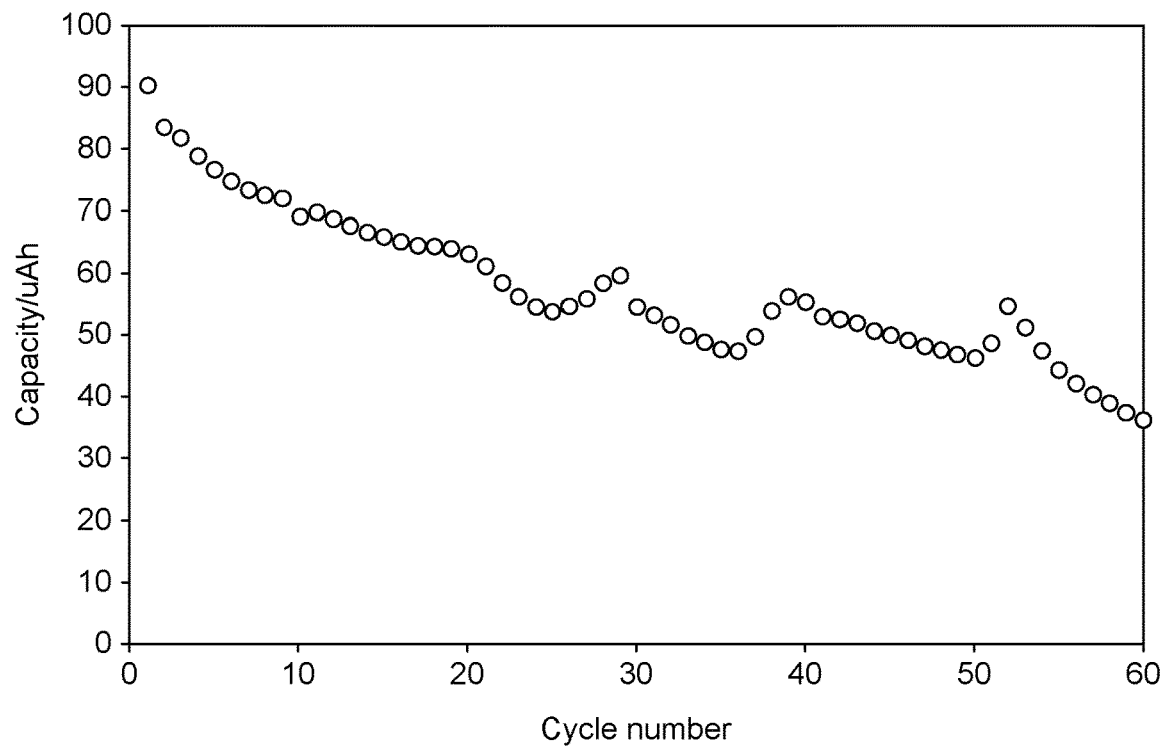

FIGS. 11B and 11C show graphs of discharge capacity obtained from another example of a thin film battery, which was also prepared according to an example of the present invention, using a direct write laser technique.

In this thin film battery, a conductive substrate (p-type boron-doped silicon) was used in place of the non-conductive substrate (sapphire) of the battery of FIG. 9B. An additional difference over the battery of FIG. 9B is that, during manufacture of the battery, the stack of layers, including the adhesion layer, cathode, electrolyte, anode, and current collectors, was deposited without using a mask, so as to cover the entire substrate.

The adhesion layer of titanium oxide was sputtered from a titanium target with oxygen process gas at 400° C. The platinum cathode collector layer was sputtered from a platinum target at 400° C. The lithium cobalt oxide cathode was co-deposited at a substrate temperature of 400° C. via physical vapour deposition from a lithium Knudsen cell and a cobalt electron gun in oxygen plasma. The electrolyte layer, LiPON was deposited by RF magnetron sputtering at 150° C. from a $Li_3PO_4$ target in nitrogen gas. The amorphous silicon anode was deposited by physical vapour deposition at 25° C. from a silicon electron gun. The platinum anode collector layer was deposited by DC sputtering at 25° C. from a platinum target.

A direct write laser technique according to the present invention was used to ablate through every battery layer and partially into the substrate, so as to divide the stack of layers into individual thin film batteries.

Following this, a dielectric passivation layer was applied to the battery array. The encapsulation layer comprised sputtered aluminium oxide and aluminium nitride diads deposited at 150° C. from an aluminium target in oxygen and nitrogen process gases. Using photolithography and a dry etch, a small circular portion of the anode current collector was exposed on the top of the battery, to provide a contact point. Contact to the cathode current collector is achieved via the conductive substrate.

The discharge capacities of the batteries prepared in this way were measured over 60 consecutive cycles. FIGS. 11B and 11C show that direct write laser cutting may also be used to provide functioning batteries in the case that the batteries have a conductive substrate.

Some fluctuations in discharge capacity may be seen in FIGS. 11A, 11B, and 11C: these are considered to be due to variations in ambient temperature.

Figure 12B:
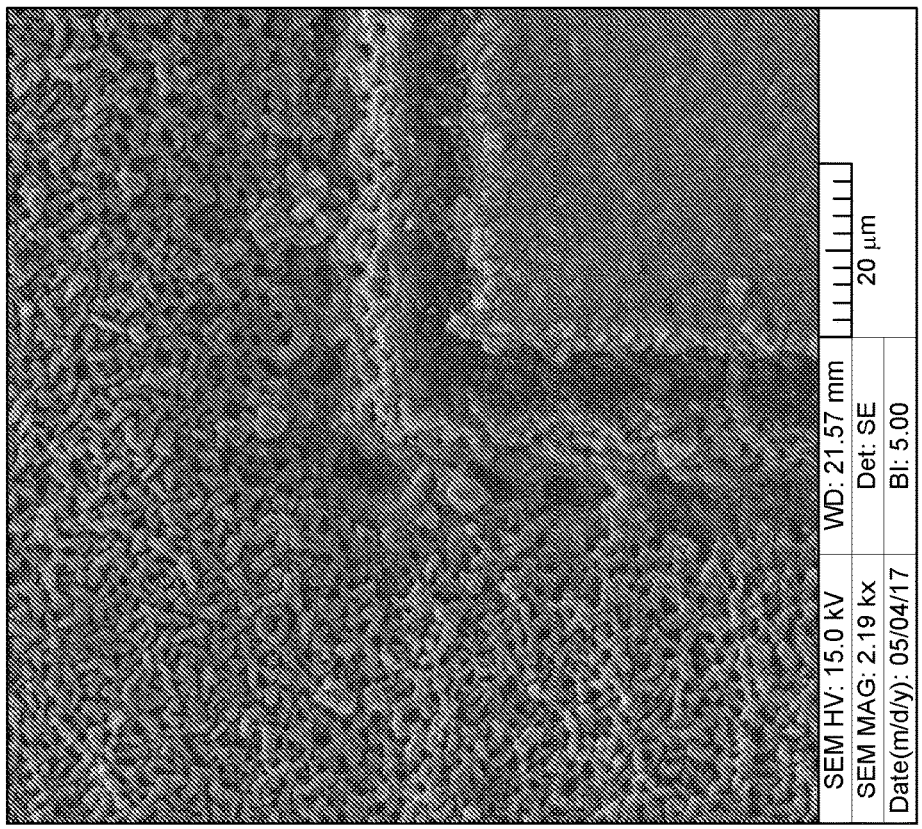
FIGS. 12A and 12B show scanning electron microscope images of a rectangular cut made in a thin film stack using an example method of the present invention.
Figure 12A:
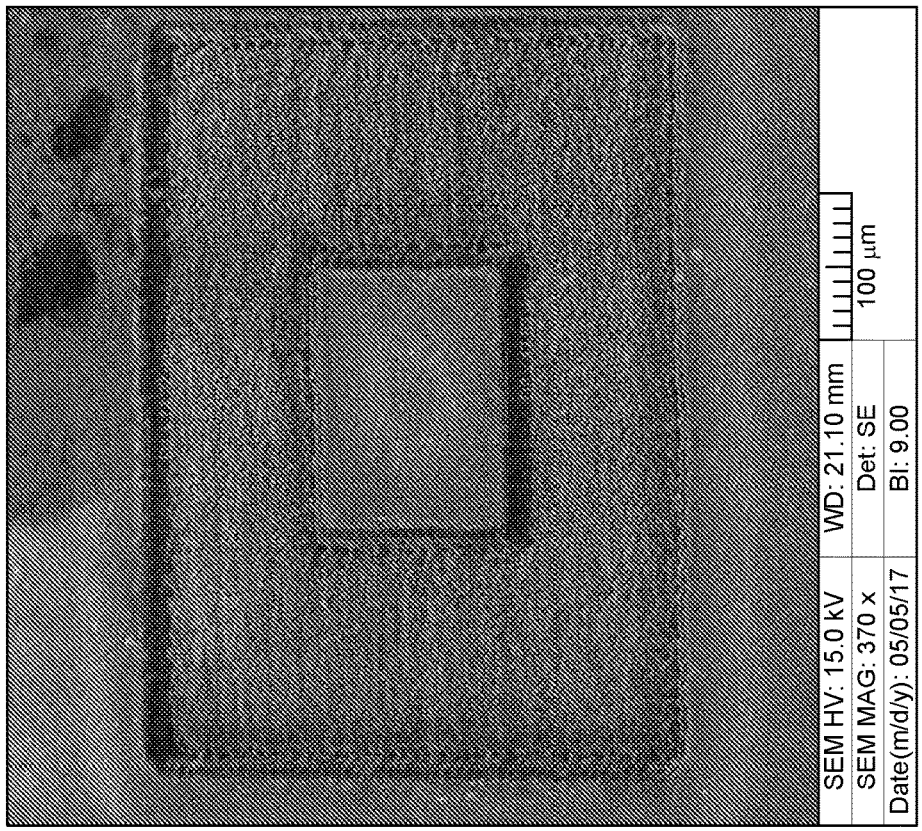

FIGS. 12A and 12B show scanning electron microscope images at different magnification levels (as labelled) of an example laser direct write cut, where the cut path followed a rectangular path around a small central rectangle of stack material as shown in FIG. 12A. The width of the cut path is of the order of 100 to 150 μm. The images show the texture of the substrate surface exposed by the laser ablation at the base of the cut. Also, the sloped and stepped sides of the cut produced by a Gaussian intensity profile for the laser writing beam, as discussed above, can be seen.

Figure 13:
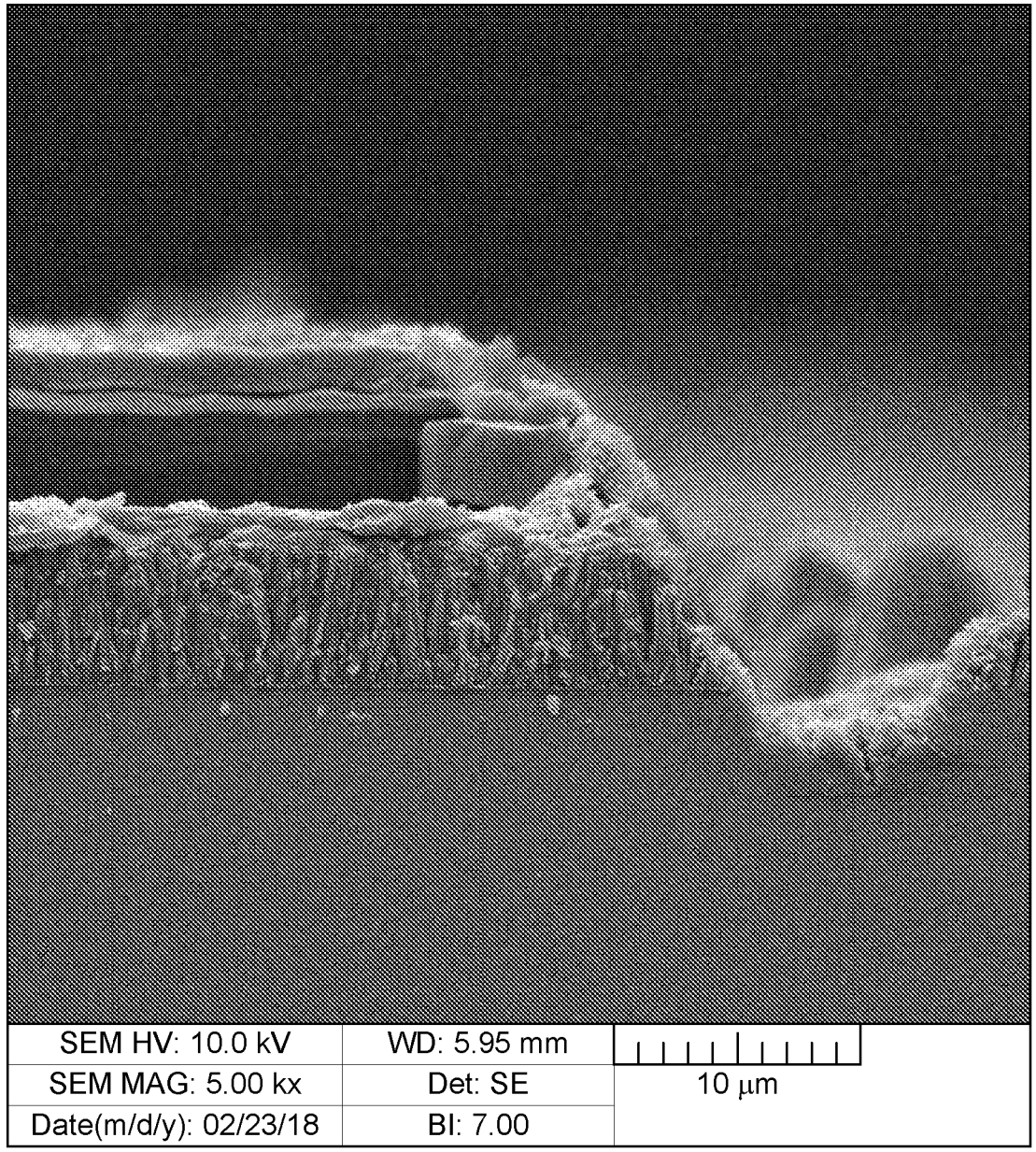
FIG. 13 shows a scanning electron microscope image of the edge of a laser processed stack where the laser beam was incident on the stack from an angle less than 90° with respect to the substrate.

FIG. 13 shows a scanning electron microscope image of the edge of a laser processed stack where the laser beam was incident on the stack from an angle less than 90° with respect to the substrate. The images show this resulted in stack edge angles below 90° with respect to the substrate.

The fluence delivered by the laser writing beam to the thin film stack is an important parameter for examples of the disclosed method. As already described, the fluence should be above a threshold required to produce the effect of laser ablation to achieve the cutting, but should be limited having regard to the quality of the cut surface if necessary, where an increased fluence tends to increase the surface roughness. Accordingly, the fluence may be selected to be within a range of 50 to 100,000 $mJ/cm^{-2}$. Values towards the lower end of this range may be adequate in many cases, so that lower power lasers can be used if more convenient. For example, successful cutting can be readily achieved for fluences around 865 $mJ/cm^{-2}$, such as between 800 and 900 $mJ/cm^{-2}$, or between 850 and 950 $mJ/cm^{-2}$, or between 800 to 1000 $mJ/cm^{-2}$, or between 700 to 1000 $mJ/cm^{-2}$. Also values towards the higher end of the range may be adequate in many cases, for examples successful cutting can be readily achieved for fluences between 50 to 50000 $mJ\ cm^{-2}$, or 50 to 10000 $mJ\ cm^{-2}$, or 50 to 5000 $mJ\ cm^{-2}$, or 50 to 2500 $mJ\ cm^{-2}$, or 50 to 1500 $mJ\ cm^{-2}$, or 50 to 1000 $mJ\ cm^{-2}$, or 50 to 800 $mJ\ cm^{-2}$, or 50 to 700 $mJ\ cm^{-2}$. Successful cutting can also be readily achieved for fluences around 550 $mJ/cm^2$, such as between 200 to 900 $mJ\ cm^{-2}$, or 50 to 600 $mJ\ cm^{-2}$, or 200 to 600 $mJ\ cm^{-2}$, or 400 to 600 $mJ\ cm^{-2}$, or 500 to 1200 $mJ\ cm^{-2}$, 500 to 900 $mJ\ cm^{-2}$, 500 to 600 $mJ\ cm^{-2}$, 525 to 575 $mJ\ cm^{-2}$, or 800 to 900 $mJ\ cm^{-2}$. Also, successful cutting can be achieved in the range of 200 to 1100 $mJ\ cm^{-2}$, such as 200 to 300 $mJ\ cm^{-2}$, or 300 to 400 $mJ\ cm^{-2}$, or 400 to 500 $mJ\ cm^{-2}$, or 500 to 600 $mJ\ cm^{-2}$, or 600 to 700 $mJ\ cm^{-2}$, or 700 to 800 $mJ\ cm^{-2}$, or 800 to 900 $mJ\ cm^{-2}$, or 900 to 1000 $mJ\ cm^{-2}$, or 1000 to 1100 $mJ\ cm^{-2}$, The chosen level of fluence can be delivered by selecting an appropriate combination of operating parameters for the laser and the apparatus as a whole, which are typically adjustable or can be readily specified. In particular, the pulse repetition rate and the writing scan speed can be varied to modify the fluence, with a wide selection of combinations of values being available to achieve the required fluence. The repetition rate can be chosen to be within the range, for example, of 0.1 to 10,000 kHz. For example, the repetition rate may be chosen to be in the range 0.1 to 100 kHz, 100 to 1000 kHz, 1000 to 5000 kHz, or 0.1 to 2500 kHz, or 0.1 to 1000 kHz, or 0.1 to 500 kHz, or 0.1 to 300 kHz, or 0.1 to 250 kHz, or 10 to 250 kHz or 10 to 200 kHz, or 100 to 250 kHz, or 150 to 250 kHz, or 180 to 220 kHz. Furthermore, values less than 400 kHz may be adequate in many cases, such as between 0.1 to 50 kHz, or 50 to 100 kHz, or 100 to 150 kHz, or 150 to 200 kHz, or 200 to 250 kHz, or 250 to 300 kHz, or 300 to 350 kHz, or 350 to 400 kHz.

It might be expected that repetition rates of about 200 kHz and above could be detrimental because of an excess of residual heat remaining in the stack material from earlier pulses (insufficient cooling time between pulses), leading to damage beyond the volume of the cut, and a poor cut surface quality. However, this has not been found, and indeed, a good surface quality and uniformity can be produced at or around 200 kHz compared to lower repetition rates.

The scan (writing) speed may be chosen to be within the range, for example, of 1 to 10,000 mm/s. The combination of a higher repetition rate and a faster scan speed may produce the same fluence as a lower repetition rate and a slower scan speed. While the scan speed may be very fast, speeds in the lower part of this range can be suitable which may simplify the apparatus. Scan speeds of the invention may be selected from: 1 to 5000 mm/s, 1 to 1000 mm/s, 1 to 750 mm/s, 1 to 500 mm/s, 1 to 400 mm/s, 1 to 300 mm/s, 1 to 200 mm/s, 1 to 150 mm/s, 50 to 600 mm/s, 50 to 150 mm/s, 75 to 125 mm/s, 100 to 1000 mm/s, 100 to 200 mm/s, 100 to 500 mm/s, 200 to 300 mm/s, 300 to 400 mm/s, 400 to 500 mm/s 500 to 600 mm/s, 600 to 700 mm/s, 700 to 800 mm/s, 800 to 900 mm/s, or 900 to 1000 mm/s. Other scan speeds include around 500 mms-1, 400 to 600 mm/s, 450 to 550 mm/s, or 475 to 525 mm/s.

The beam diameter (spot size) of the writing beam may also be selected to provide a particular fluence. As noted above, the beam diameter will in many cases be smaller or significantly smaller than the desired width of the cut. For example, the beam diameter may be in the range of 0.001 to 0.1 mm (1 to 100 µm). A smaller spot size will require a longer writing path to expose the entirety of the area of the cut line, for a given cut line width, but the writing process can be maintained at an efficient rate by increasing the scan speed, and compensating by increasing the pulse repetition rate to maintain the same fluence. Relatively small beam widths may be convenient in some cases, such as around 0.015 mm (15 µm). For example, the beam width may be set within the range selected from: 1 to 100 µm, 1 to 75 µm, 1 to 50 µm, 1 to 40 µm, 1 to 30 µm, 1 to 25 µm, 1 to 20 µm, 1 to 17.5 µm, 5 to 20 µm, 10 to 20 µm, 12 to 18 µm, 13 to 17 µm, or 14 to 16 µm. Furthermore, higher beam widths include ranges selected from: 20 to 40 µm, 40 to 60 µm, 60 to 80 µm, or 80 to 100 µm.

One or more passes of the beam spot over the writing path may be necessary to remove the required depth of material through the entire stack and down to or beyond the level of the substrate. Clearly, this will depend on factors including the thickness of a particular stack and the fluence level delivered by the writing beam. The number of passes may fall in the range of 1 to 100, for example. Successful cutting can be achieved with a relatively small number of passes, such as a number selected from 1, 2, 3, 4, 5, 6, 7, 8, 9 or 10, or within the range of 4 to 8, 1 to 10, 1 to 20, 10-20, 20-30, 30-40, 40-50, 50-60, 70-80, or 90-100.

A further variable is the duration or width of the pulses output by the ultrafast laser. The pulse width may be chosen to be in the range of 10 to 100,000 femtoseconds, for example (0.01 to 100 picoseconds). Pulse widths in the shorter part of this range may be convenient if the same output power is compressed into a shorter pulse, since the required total energy can be delivered more quickly. Pulse widths of the invention include a pulse with or range of pulse widths selected from: around 130 fs, 10 to 100000 fs, 10 to 50000 fs, 10 to 25000 fs, 10 to 10000 fs, 10 to 5000 fs, 10 to 2500 fs, 10 to 1500 fs, 10 to 1000 fs, 10 to 800 fs, 10 to 600 fs, 10 to 400 fs, 10 to 300 fs, 10 to 200 fs, 50 to 200 fs, 75 to 200 fs, 100 to 160 fs, 100 to 200 fs, 120 to 140 fs, 125 to 135 fs, less than or equal to 200 fs, 1 to 50 fs, 50 to 100 fs, 100 to 150 fs, 100 to 200 fs, 50 to 150 fs, 50 to 200 fs, higher than 200 fs, 200 to 250 fs, 250 to 300 fs, 300 to 350 fs, 350 to 400 fs, 400 to 450 fs, or 450 to 500 fs. Much longer pulses are not precluded so that a range of different laser sources can be used to perform the laser cutting process according to convenience. Use of ultra-short (femtosecond-picosecond) pulses is advantageous as it minimises heat conduction in the material being ablated compared to longer pulse times, resulting in improved precision, repeatability and lower thermal damage [Ref 4 & 5].

The wavelength of the laser beam can be selected within a conveniently wide range also, again adding to the flexibility of the process. Wavelengths in the ultraviolet, visible and near-infrared parts of the spectrum are considered most applicable, particularly in combination with pulses in the femtosecond regime (pulse durations less than 1 picosecond). The ablation effect is a high intensity interaction that does not depend on optical absorption, so that with shorter pulses for which the amount of absorption is minimal, the wavelength is less significant, particularly towards ultraviolet wavelengths.

The wavelength may be selected from a wavelength in the range of 100 to 1500 nm. The some embodiments, the wavelength is a range selected from any one of: 100 to 1250 nm, 100 to 1000 nm, 100 to 750 nm, 100 to 500 nm, 100 to 400 nm, 100 to 300 nm, 100 to 200 nm, 200 to 350 nm, 200 to 500 nm, 250 to 450 nm, 300 to 400 nm, 325 to 375 nm, 325 to 350 nm, 200 to 300 nm, 300 to 400 nm, 400 to 500 nm, higher than 500 nm, 500 to 600 nm, 600 to 700 nm, 700 to 800 nm, 800 to 900 nm, 900 to 1000 nm, 1000 to 1100 nm 1100 to 1200 nm, 1200 to 1300 nm, 1300 to 1400 nm, or 1400 to 1500 nm. In some embodiments, the wavelength is 343 nm. In other embodiments, the wavelength may also be 355 nm. In one example, the wavelength is between 300 and 350 nm and the pulse duration is less than 200 fs or less than 150 fs.

The interrelation of many of the parameters described above means that a similar ablation can be achieved with a variety of parameter value sets. As discussed above, the combined effect of variables pulse width, rep rate, laser spot area, scan speed, laser path, number of passes and laser energy (fluence or energy per pulse) can be estimated by calculating (as described in equation 1) the single parameter total energy per unit area of ablation, $E_T$ which has units of mJ mm$^{-2}$. A value for $E_T$ includes a range selected from: $1 \times 10^{-6}$ to 1000 mJ mm$^{-2}$, more specifically $1 \times 10^{-6}$ to 500 mJ mm$^{-2}$, $1 \times 10^{-6}$ to 100 mJ mm$^{-2}$, $1 \times 10^{-6}$ to 50 mJ mm$^{-2}$, $1 \times 10^{-6}$ to 10 mJ mm$^{-2}$, $1 \times 10^{-6}$ to 5 mJ mm$^{-2}$, $1 \times 10^{-6}$ to 1 mJ mm$^{-2}$, $1 \times 10^{-6}$ to 0.75 mJ mm$^{-2}$, $1 \times 10^{-4}$ to 0.1 mJ mm$^{-2}$, $1 \times 10^{-6}$ to 0.05 mJ mm$^{-2}$, $1 \times 10^{-6}$ to $1 \times 10^{-5}$ mJ mm$^{-2}$, $1 \times 10^{-5}$ to $1 \times 10^{-4}$ mJ mm$^{-2}$, $1 \times 10^{-4}$ to $1 \times 10^{-3}$ mJ mm$^{-2}$, $1 \times 10^{-3}$ to 0.01 mJ mm$^{-2}$, 0.01 to 0.1 mJ mm$^{-2}$, 0.1 to 1 mJ mm$^{-2}$, 1 to 10 mJ mm$^{-2}$, 10 to 100 mJ mm$^{-2}$, 100 to 1000 mJ mm$^{-2}$, or $1 \times 10^{-5}$ to 1 mJ mm$^{-2}$.

Figure 14:
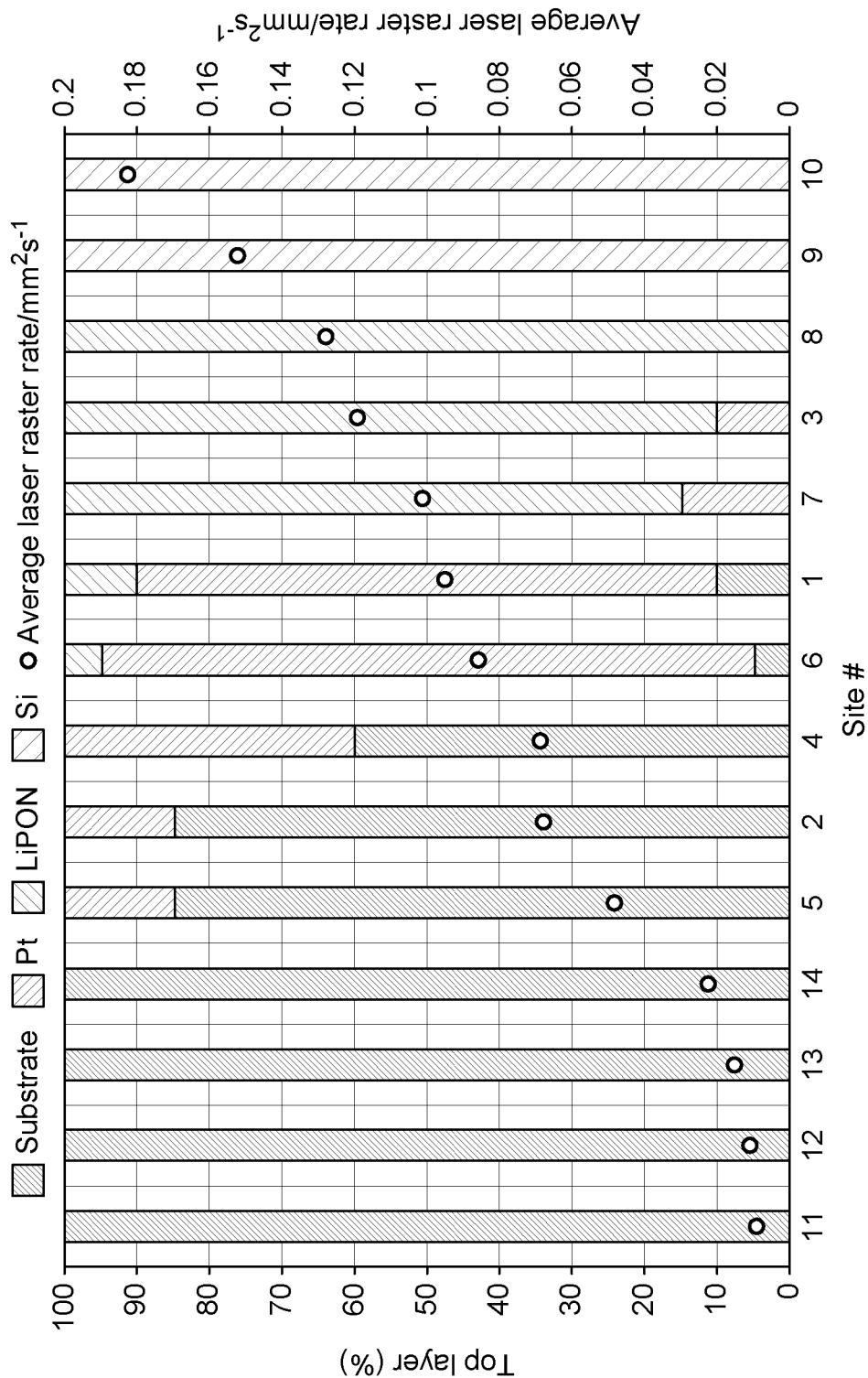
FIG. 14 shows a bar chart of a relationship between laser raster rate and ablation depth for an example method of the present invention.
Figure 15:
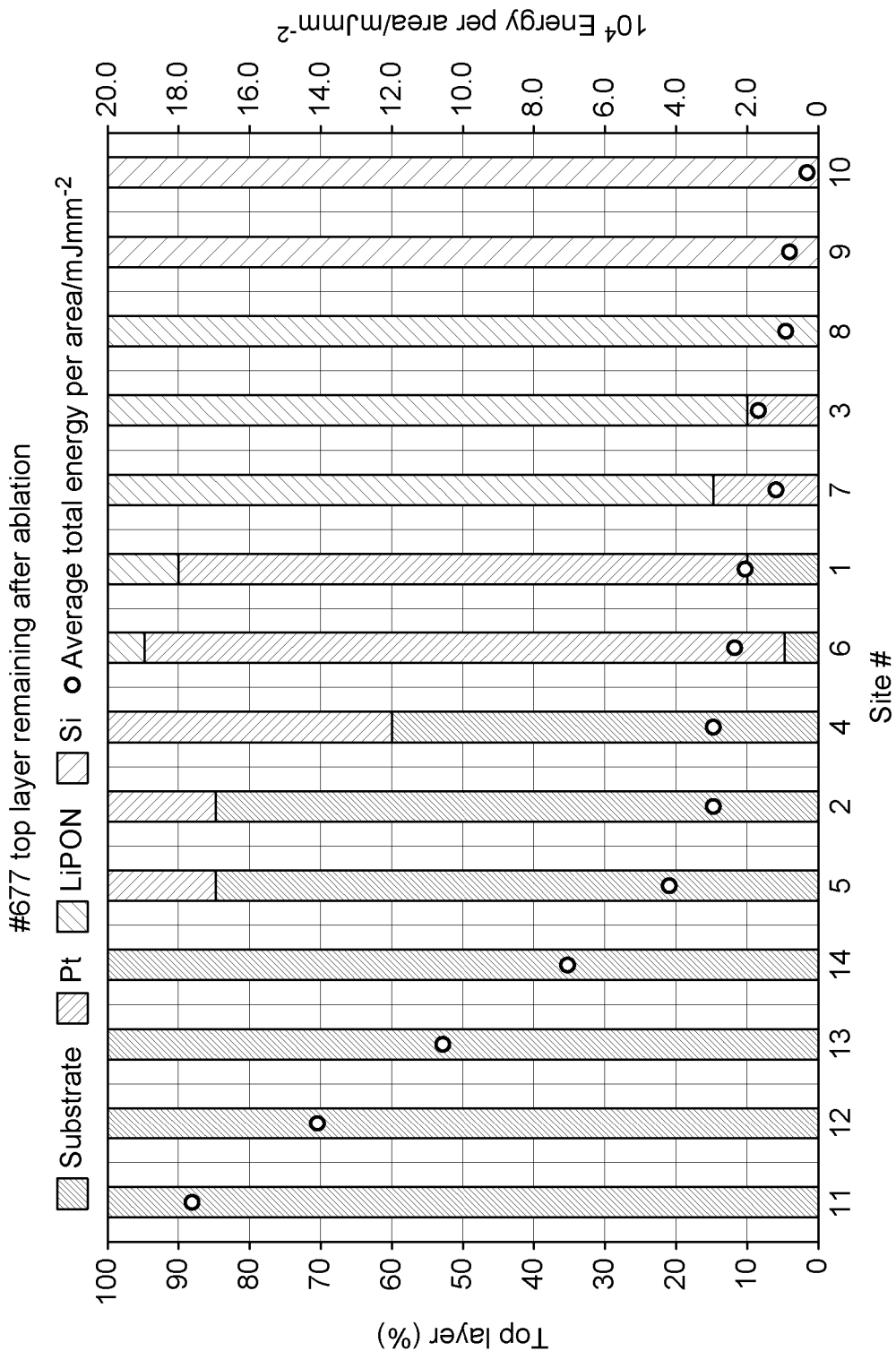
FIG. 15 shows a bar chart of a relationship between total laser energy delivered per area and ablation depth for an example method of the present invention.

FIGS. 14 and 15 show plots of data that demonstrate the effect of varying the process parameters on the efficacy of the process. The plots show bar charts, with a bar for each of a selection of deposited thin film structures that have been subjected to the laser direct write cutting process. Each bar is shaded to indicate the proportion (left axis) of the different materials making up the layers in the stack which are present in the upper surface (top layer) formed at the base of the cut channel after the cutting has been carried out. The darkest shading represents the substrate, indicating that the cut has penetrated right through the full depth of the stack. Successively paler shading indicates the successively higher layers of a platinum cathode current collector, a LiPON electrolyte layer and a silicon anode, corresponding to shallow cuts that have reached only part of the way through the stack depth. The bars are arranged roughly in order of decreasing cut depth from left (the top layer is 100% substrate material) to right (the top layer is 100% silicon). The three charts show bars for the same selection of fourteen processed stacks.

FIG. 14 shows the effect of different laser raster rates on the achievable cut depth. Each bar in the chart has a corresponding data point marked by a spot which shows the average laser raster rate $R_{raster}$ as calculated according to equation 2 (right axis) where $t_T$ is total ablation time in seconds and $A_T$ is total area of ablation in millimetres squared.

$$R_{raster} = \frac{A_T}{t_T} \quad \text{Equation 2}$$

The deepest channels on the left of the chart are formed with the slowest raster rates, since a slow speed delivers more pulses per unit path length and hence more laser energy per unit volume of material, so the ablation is more effective. The shallower channels on the right of the chart are formed at much faster raster rate. In this particular example, cut depths that extend through to the substrate were formed for laser raster rates of about 0.025 mm²/s and below, while rates of about 0.045 mm²/s and above did not cut through the full stack depth. Note that this parameter is distinct from but proportional to the scan speed. Raster rates less than 10 mm²/s are generally appropriate for successful ablation, such as in the range of 0.001 to 10 mm²/s, or more specifically 0.001 to 1 mm²/s, 0.001 to 0.8 mm²/s, 0.001 to 0.6 mm²/s, 0.001 to 0.5 mm²/s, 0.001 to 0.4 mm²/s, 0.001 to 0.3 mm²/s, 0.001 to 0.2 mm²/s, or 0.001 to 0.1 mm²/s. Raster rates higher than 0.005 mm²/s may also be appropriate, such as between 0.005 to 1 mm²/s, 0.005 to 0.8 mm²/s, 0.005 to 0.6 mm²/s, 0.005 to 0.4 mm²/s, 0.005 to 0.3 mm²/s, 0.005 to 0.2 mm²/s, 0.01 to 0.2 mm²/s, 0.05 to 0.15 mm²/s, 0.08 to 0.12 mm²/s, or 0.09 to 0.11 mm²/s.

FIG. 15 shows the effect of varying the average total energy delivered per unit area (as calculated by equation 1) over the cut line. Each bar in the chart has a corresponding data point marked by a spot which shows the energy per area (right axis). The deepest channels on the left of the chart are produced from the highest levels of energy per area. Smaller amounts of energy per area produce shallower cuts that do not reach the substrate. In this particular example, cut depths that extend through to the substrate were formed for energies of about $7 \times 10^{-4}$ mJ/mm² and above, while energies of about $4.2 \times 10^{-4}$ mJ/mm² and below did not cut through the full stack depth.

The effectiveness of the process in cutting through the stack thickness to the substrate will naturally depend to some extent on the depth of the stack and the thickness of the individual layers within in. For a given set of laser beam and scanning parameters, it may be necessary to adjust the number of passes along the scan path in proportion to the stack depth so as to deliver an appropriate total amount of energy to reach the substrate, but without cutting excessively into the substrate as this would be a waste of energy and cutting time. Adjustment of the parameters can tailor the cutting process to accommodate a wide variety of stack thicknesses.

The total thickness of the thin film stack, perpendicular to the substrate surface and measured from that surface (therefore, excluding the substrate thickness), may be in the range of about 1 to 200 μm, 1.5 to 200 μm, 1 to 170 μm, 1.5 to 170 μm, 1 to 150 μm, 1.5 to 150 μm, 150 μm or less, 170 μm or less, or 200 μm or less, for example. Typical stack thicknesses may be around 10 μm, such as between 10 and 20 μm, 10 and 40 μm, 8 and 12 μm or between 5 and 15 μm or between 2 and 20 μm, for example.

Within the stack, the individual thin film layers may have a range of thickness values in the direction perpendicular to the substrate surface. Typically, a thin film can be considered as a layer or film of material with a thickness up to about 100 μm, or more commonly up to about 50 μm. Two or more such layers make up a stack in the present context. The choice, order and number of the layers within the stack will depend on the intended purpose of the diced thin film structure. An adhesion layer at the base of the stack may have a thickness of 0.005 to 0.1 μm, for example, such as about 0.015 μm, or between 0.005 to 0.025 μm. For a thin film battery, a cathode current collector layer may have a thickness of 0.05 to 1 μm, for example, such as about 0.25 μm, or between 0.2 and 0.3 μm. A cathode layer may have a thickness of 1 to 50 μm, for example, such as about 5 μm or 1 to 10 μm, 10 to 20 μm, 20 to 30 μm, or 30 to 50 μm. An electrolyte layer may have a thickness of 0.1 to 5 μm, for example, such as 1 to 5 μm, 2 to 4 μm, or about 3 μm. An anode layer may have a thickness of 0.1 to 10 μm, for example, such as about 0.5 μm, or between 0.1 and 1.0 μm. An anode current collector layer may have a thickness of 0.05 and 1 μm, for example, such as about 0.1 μm, or between 0.05 and 0.15 μm. A dielectric encapsulation layer may have a thickness of 0.2 to 100 μm, for example, such as 1.5 μm, or between 1 and 10 μm.

The supporting substrate may or may not be cut into, i.e., partially cut, by the laser processing. In other words, the cut may extend to the upper substrate surface only, or may extend past the upper substrate surface and into the material of the substrate for some distance. For any fabrication in which further processing of the isolated cells is facilitated by the substrate remaining in a single piece (an intact wafer) so that the cells can be processed together in subsequent steps, the cut should stop at the substrate surface or within the thickness of the substrate. In other cases, however, the direct write laser cutting can be carried out so as to slice through the thickness of the substrate thickness as well as the stack thickness, to fully separate the individual cells or elements from one another in a single cutting procedure. The substrate might have a thickness in the range of 50 to 750 μm, such as about 675 μm, or between 600 and 700 μm, but these are example values only and substrates of other thicknesses might be used.

The utilisation of the high intensity interaction between the laser energy and the stack material that causes ablation to remove material and form a cut channel in a thin film structure means that the process is widely applicable to many materials. It is not subject to limitations arising from the optical absorption characteristics of different materials, since ablation does not rely on absorption. This also gives freedom with the choice of wavelength for the laser beam. In the regime of ultra-short laser pulses (particularly sub-picosecond pulses) the direct write laser cutting process can be carried out regardless of the materials in the stack and the wavelength of the laser beam.

In one embodiment, the stack is a battery comprising a substrate, positive electrode current collector, a positive electrode active material, an electrolyte, a negative electrode active material, and a negative electrode current collector.

In one embodiment, the negative electrode current collector comprises a negative electrode current collector material selected from the group consisting of Pt, Ni, Mo, Cu, TiN, Al, Au and stainless steel.

In another embodiment, the positive electrode current collector material selected from the group consisting of Pt, Ni, Mo, Al, Au, stainless steel, indium doped tin oxide (ITO) and other electrically conducting metal oxides.

In another embodiment, the battery further comprises a passivation layer (e.g., $Si_3N_4$) and/adhesion layer (e.g., $TiO_2$) between the substrate and current collector. In another embodiment, the battery comprises an encapsulation layer. In a further embodiment, the encapsulation layer comprises $Si_3N_4$, $SiO_2$, $Al_2O_3$, Al, Cu, parylene, polyimide, or SURLYN.

The substrate may be non-conductive, semi-conductive, conductive material (such as p-type boron-doped silicon grown by the Czochralski method (CZ silicon)). In one embodiment, the battery comprises a substrate material selected from the group consisting of AlOPt (Sapphire/TiO$_2$/Pt), SSTOP (Si/SiO$_2$/TiO$_2$), Si, SiO$_2$, Si$_3$N$_4$, mica, and float glass.

A positive electrode active material of a battery of the present invention include a lithiated transition metal compound, such as a lithium nickel manganese oxide, lithium nickel vanadium oxide, lithium cobalt vanadium oxide, or lithium cobalt phosphate, for example Li$_2$NiMn$_3$O$_8$, LiNiVO$_4$, LiCoVO$_4$, LiCoPO$_4$, and the like. Other examples include lithium nickel phosphate, lithium nickel fluorophosphate, and lithium cobalt fluorophosphate; i.e. LiNiPO$_4$, Li$_2$NiPO$_4$F, Li$_2$CoPO$_4$F, and the like. The lithium content typically varies depending on the state of charge of the battery. The positive active material may comprise other oxygen-containing materials, such as an oxide, manganate, nickelate, vanadate, phosphate, or fluorophosphate. The positive active material may have the formula LixMyNzO, where M is selected from a group consisting of Ni, Mn, V, and Co, and N is a heteroatomic species different from M, such as Ni, Mn, V, Co, or P. N can be omitted. The positive active material may also be fluorinated, for example as a fluorophosphate.

In one embodiment, the positive electrode active material of a battery of the present invention is selected from the group consisting of LiCoO$_2$, FeS$_2$, LiCoPO$_4$, LiFePO$_4$, Li$_2$FeS$_2$, Li$_2$FeSiO$_4$, LiMn$_2$O$_4$, LiMnPO$_4$, LiNiPO$_4$, LiV$_3$O$_8$, LiV$_6$O$_{13}$, LiVOPO$_4$, LiVOPO$_4$F, Li$_3$V$_2$(PO$_4$)$_3$, MnO$_2$, MoS$_3$, S, TiS$_2$, TiS$_3$, V$_2$O$_5$, V$_6$O$_{13}$, LiNi$_{0.5}$Mn$_{1.5}$O$_4$, and LiMnNiCoAlO$_2$.

In another embodiment, the positive electrode active material of a battery of the present invention is high voltage positive electrode active materials. In a further embodiment the high voltage positive electrode active material is selected from the group consisting of LiCoPO$_4$, LiNi$_{0.5}$Mn$_{1.5}$O$_4$, LiMnPO$_4$, LiMn$_2$O$_4$, LiCoO$_2$, LiNi$_{1/3}$Mn$_{1/3}$Co$_{1/3}$O$_2$, LiFePO$_4$, LiNiPO$_4$, Li$_2$NiPO$_4$F, Li$_2$CoPO$_4$F, LiMnPO$_4$F, Li$_2$CoSiO$_4$, Li$_2$MnSiO$_4$, FeF$_3$, LiMn$_{0.8}$Fe$_{0.1}$Ni$_{0.1}$PO$_4$, Li$_{1-x}$VOPO$_4$ and Li$_2$FePO$_4$F.

In a preferred embodiment, the positive electrode active material is LiCoO$_2$.

In one embodiment, the electrolyte is selected from: lithium phosphorus oxynitride (LiPON); lithium borosilicate or nitrogen doped lithium borosilicate (as described in WO2017/216532, WO2015/104540 and WO2015/104538); sulfide based glassy and glass-ceramic electrolytes e.g. LPS (xLi$_2$S-yP$_2$S$_5$), Li$_2$—SiS$_2$, garnet-type solid electrolytes e.g. Li$_5$La$_3$M$_2$O$_{12}$ or LLZO (Li$_7$La$_3$Zr$_2$O$_{12}$), argyrodite-type e.g. Li$_6$PS$_5$X, X=Cl, Br, I, oxide based perovskite-type solid electrolytes e.g., LLTO (Li$_{0.5}$La$_{0.5}$TiO$_3$); LISICON-type e.g. Li$_{10}$GeP$_2$S$_{12}$, NASICON-type e.g. Li1.4[Al$_{0.4}$Ge$_{1.6}$(PO$_4$)$_3$], LATP (Li$_{1+x}$Al$_x$Ti$_{2-x}$(PO$_4$)$_3$, or solid polymer electrolytes e.g., polyethylene oxide (PEO). In a preferred embodiment, the electrolyte comprises lithium phosphorus oxynitride (LiPON).

In one embodiment, negative electrode active material used in the battery of the present invention may be selected from Li$_4$Ti$_5$O$_{12}$, Si, Ge, Sn, Sb, Al, Mg, Bi, Si-M (M=Mg, Al, Sn, Zn, Ag, Fe, Ni, Mn), InSb, metal oxides including; TiO$_2$, vanadium and molybdenum oxides, Ti, Nb oxides (MgTi$_2$O$_5$, TiNb$_2$O$_7$), SnO, SnO$_2$, Sb oxides, or germanates. In one embodiment, the negative electrode active material is amorphous Si.

In another embodiment, the negative electrode active material used in the battery of the present invention is lithium or a lithiated transition metal oxide, such as lithium titanium oxide. The negative electrode active material may be a lithium metal alloy, including LiSi, LiSb or LiGe. The negative electrode active material may also be a carbon-containing material (such as activated carbon) capable of reversibly intercalating lithium ions, a tin containing material, a silicon-containing material, or other material.

Negative electrode active materials further include graphite, synthetic graphite, coke, fullerenes, niobium pentoxide, tin alloys, silicon (including amorphous silicon), titanium oxide, tin oxide, and lithium titanium oxide.

Negative electrode active materials comprising elemental carbon materials include graphite, synthetic graphite, coke, fullerenes, carbon nanotubes, other graphitic carbon and combinations thereof. Graphitic carbon refers to any elemental carbon material comprising substantial domains of graphene sheets.

In one embodiment, the negative electrode active material comprises lithium metal, or an alloy thereof, and the battery is a rechargeable (secondary) lithium ion battery. In a further embodiment, the negative electrode may comprise a layer of lithium metal, or a lithium-aluminum alloy. In another embodiment, the negative electrode is lithium. In another embodiment, the negative electrode is a lithium free anode. In another embodiment, the negative electrode is a lithium air anode.

In some embodiments, the electrode is a lithium intercalation electrode. As used herein, the term "intercalation" refers to the reversible inclusion or insertion of a molecule or ion into compounds with layered structures. Therefore, a lithium intercalation electrode may be an electrode in which lithium ions may be reversibly included or inserted into a layered structure, e.g. graphite.

Therefore, the process is applicable to thin film stacks comprising layers of any material that can be formed (such as by any deposition process) into a thin film. Some example materials have been given above in the context of a stack for fabricating thin film batteries. Other examples materials include lithium borosilicate, nitrogen-doped lithium borosilicate, oxynitride compounds, lithium silicates, oxynitride lithium silicates, lithium borates, oxynitride lithium borates, other lithium-containing oxides and oxynitrides, for example containing one or more other glass-forming elements such as germanium, aluminium, arsenic and antimony, other compounds containing glass-forming elements including boron, silicon, germanium, aluminium, arsenic and antimony, lithium manganese oxide, lithium manganese nickel oxide, LiCoO$_2$, LiNiO$_2$, LiCo$_{1/3}$Ni$_{1/3}$Mn$_{1/3}$O$_2$ (NMC), LiNi$_{0.8}$Co$_{0.15}$Al$_{0.05}$O$_2$ (NCA), LiV$_3$O$_8$, Li$_4$Ti$_5$O$_{12}$, other lithium containing transition metal oxides, and lithium containing transition metal oxy-nitrides and nitrogen-doped materials. The disclosure is in no way limited in this regard however, and the process may be applied to thin film structures in general.

The width of the cut line and final width of the cut channel can be any size as desired, although a wider channel may take longer to create, if the laser spot size is many times smaller than the cut width. As an example, cuts with a width of about 1 mm can provide a suitable level of physical spacing and separation between adjacent cells, both for electrical isolation and for ease of access for subsequent processing steps, such as excimer laser shadow masking to dice the wafer into the separate elements. The cut width might therefore be in the range of 0.9 to 1.1 mm, 0.8 to 1.2 mm, or 0.7 to 1.3 mm, for example. Cuts very much narrower, such as less than 500 µm or less than 100 µm, or wider, such as more than 1.5 mm or more than 2 mm, may be useful for some applications. In general, the process is applicable to create cut channels of any width, with a minimum width being set by the available laser spot size.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in the future.

REFERENCES

[1] WO 2015/104538
[2] WO 2015/104539
[3] WO2015/104540
[4] Hamad A. H., 2016, 'Effects of Different Laser Pulse Regimes (Nanosecond, Picosecond and Femtosecond) on the Ablation of Materials for Production of Nanoparticles in Liquid Solution', in Viskup R., High Energy and Short Pulse Lasers, Intech, DOI: 10.5772/63892
[5] Chichkov B. N., Momma C., Nolte S., von Alvensleben F. and Tünnermann A., Appl. Phys. A, 63, 109-115 (1996)

The invention claimed is:

1. A method of processing a thin film structure comprising:
providing the thin film structure comprising a stack of two or more thin film layers supported on a surface of a substrate, the stack having a depth orthogonal to the surface of the substrate;
forming a cut having a cut line width through the depth of the stack by using a direct write laser technique to scan a laser beam having a laser beam diameter or a spot width along a scan path covering an area of a desired cut line on a surface of the stack to ablate a material of the stack by creating a plasma from the material along the cut line and through the depth of the stack at least to the surface of the substrate, wherein the laser beam diameter is smaller than the cut line width and the laser beam is scanned relative to the cut line width as well as along its length to remove a required width of material;
wherein the direct write laser technique is implemented using an ultrashort pulsed laser outputting pulses with a duration of 1000 femtoseconds or less, at a wavelength in a range of 100 to 1500 nm, and delivering a fluence in a range of 50 to 100,000 mJ/cm$^2$;
and further wherein the spot width of the laser beam is 0.001 to 0.1 mm and the cut line has a width of 0.015 to 2 mm;
the method further comprising the steps of, after forming the cut through the depth of the stack, applying a layer of dielectric material to cover the surface of the stack, as well as to cover one or more side walls and a base of the cut; and
subsequently slicing through a remaining thickness of the substrate at the base of the cut.

2. The method of claim 1, wherein said laser outputting pulses have a duration selected from:
a. 300 femtoseconds or less;
b. 200 femtoseconds or less; or
c. 100 to 200 femtoseconds.

3. The method of claim 1, wherein said laser beam is scanned along the scan path at a scan speed selected from:
a. of 1 to 10,000 mm/s;
b. 50 to 600 mm/s; or
c. 100 to 500 mm/s.

4. The method of claim 1, where said pulses are output from said laser at a repetition rate selected from:
a. 0.1 to 10,000 kHz;
b. 1 to 1000 KHz;
c. 1 to 500 KHz;
d. 1 to 200 KHz;
e. 10 to 200 kHz; or
f. 100 to 200 KHz.

5. The method of claim 1, wherein said laser beam is scanned along the scan path one or more times to ablate the material of the stack.

6. The method of claim 1, wherein said laser beam is incident on the surface of the stack with the spot width selected from:
a. 0.001 to 0.01 mm;
b. 0.01 to 0.1 mm; or
c. 0.01 to 0.02 mm.

7. The method of claim 1, wherein said cut line has the width selected from:
a. 0.1 to 2 mm; or
b. 0.5 to 1 mm.

8. The method of claim 1, wherein said laser beam is incident on the surface of the stack with the spot width which is one-fiftieth or less than the width of the cut line.

9. The method of claim 1, wherein said laser beam is incident on the surface of the stack with a spot having an intensity profile that is greatest in a centre of the spot.

10. The method of claim 9, wherein said intensity profile is a Gaussian profile or a Bessel profile.

11. The method of claim 1, wherein said ablation is continued until the cut has a depth substantially level with the surface of the substrate or is continued until the cut has a depth that extends past the surface of the substrate, wherein said depth is selected from:
a. 500 µm or less;
b. 200 µm or less;
c. 100 µm or less;
d. 1-100 µm;
e. 1-50 µm;
f. 1-25 µm;
g. 1-10 µm; or
h. 10 µm or less.

12. The method of claim 1, wherein said depth of the stack is selected from:
a. 200 µm or less;
b. 50 to 200 µm;
c. 5 to 100 µm;
d. 5 to 50 µm;
e. 10 to 40 µm; or
f. 10 to 20 µm.

13. The method of claim 1, wherein said laser is scanned in a sinusoidal pattern.

14. The method of claim 13, wherein said sinusoidal pattern comprises a wave with a propagation that is perpendicular to the cut line width, with peak-to-peak amplitude equal or less than the cut line width.

15. The method of claim 1, wherein said cut line is shaped to divide the stack into a plurality of elements which are isolated from one another by the cut.

16. The method of claim 1, wherein said thin film layers of the stack correspond to layers of a battery comprising:
 a. a positive electrode active material;
 b. an electrolyte material;
 c. a negative electrode active material; and
 d. a negative electrode current collector.

17. The method of claim 16, wherein:
 a. said substrate is a conductive substrate;
 b. said positive electrode active material is $LiCoO_2$;
 c. said electrolyte material is LIPON, lithium borosilicate, or nitrogen doped lithium borosilicate;
 d. said negative electrode active material is amorphous Si; and
 e. said negative electrode current collector is platinum or molybdenum.

18. A method of fabricating a thin film battery which includes using the method of claim 1 to form a cut which isolates an element intended for the battery from a thin film structure comprising a stack of thin film battery layers.

\* \* \* \* \*